(12) United States Patent
Haley et al.

(10) Patent No.: US 9,656,847 B2
(45) Date of Patent: May 23, 2017

(54) VACUUM BOTTLE STOPPER FOR INTRODUCING INERT GAS INTO A WINE CONTAINER

(71) Applicant: Vinum Corporation, Oak Brook, IL (US)

(72) Inventors: Jean E. Haley, Oak Brook, IL (US); James D. Ryndak, Barrington Hills, IL (US); Roger M. Masson, Oak Park, IL (US)

(73) Assignee: Haley's Corker, Inc., River Forest, IL (US)

( * ) Notice: Subject to any disclaimer, the term of this patent is extended or adjusted under 35 U.S.C. 154(b) by 472 days.

(21) Appl. No.: 14/214,038

(22) Filed: Mar. 14, 2014

(65) Prior Publication Data

US 2015/0259186 A1    Sep. 17, 2015

(51) Int. Cl.
*B65B 31/00*    (2006.01)
*B65B 55/00*    (2006.01)
(Continued)

(52) U.S. Cl.
CPC .............. *B67C 3/16* (2013.01); *B65D 47/141* (2013.01); *B65D 81/2038* (2013.01);
(Continued)

(58) Field of Classification Search
CPC ........... B67C 3/16; B67C 3/22; B65D 47/141; B65D 81/2038; B65D 81/2076;
(Continued)

(56) References Cited

U.S. PATENT DOCUMENTS

| 1,649,530 A | 11/1927 | Holsinger |
| 1,907,358 A | 5/1933 | Kuehne |

(Continued)

FOREIGN PATENT DOCUMENTS

| CH | 672917 A5 * | 1/1990 | ............ B65B 31/04 |
| DE | 102010025122 A1 * | 12/2011 | ............... C12H 1/14 |

(Continued)

OTHER PUBLICATIONS

Copending U.S. Appl. No. 13/840,344, Haley at al, Vacuum Bottle Stopper for Wine and Method, filed Mar. 15, 2013.

(Continued)

*Primary Examiner* — Gloria R Weeks
*Assistant Examiner* — William A Weller
(74) *Attorney, Agent, or Firm* — Hinshaw & Culbertson LLP

(57) ABSTRACT

Vacuum bottle stoppers for wine, particularly suited for partially consumed bottles of wine are disclosed. Systems are also disclosed for evacuating a partially consumed bottle of wine, filling the wine bottle head space with an inert or other gas and the storing the wine bottle while maintaining the inert or other gas in the bottle. The stopper has a vacuum valve and a vacuum indicator in a removable cap. The vacuum valve has a self-closing passageway due to the passageway traversing an elastomeric material. The vacuum indicator moves in response to vacuum and reveals a marking on a valve opener when a desired vacuum is achieved.

7 Claims, 12 Drawing Sheets

(51) Int. Cl.
| | |
|---|---|
| *B65B 31/04* | (2006.01) |
| *B67C 3/16* | (2006.01) |
| *B67C 3/22* | (2006.01) |
| *B67B 1/04* | (2006.01) |
| *C12H 1/14* | (2006.01) |
| *B65D 81/20* | (2006.01) |
| *B65D 47/14* | (2006.01) |

(52) U.S. Cl.
CPC ............ *B65D 81/2076* (2013.01); *B67B 1/04* (2013.01); *B67C 3/22* (2013.01); *C12H 1/14* (2013.01)

(58) Field of Classification Search
CPC .. B67B 1/04; C12H 1/14; B65B 31/00; B65B 31/04; B65B 55/00
USPC ........ 53/285, 287, 432, 510, 79, 86; 141/65, 141/66
See application file for complete search history.

(56) References Cited

U.S. PATENT DOCUMENTS

| | | | |
|---|---|---|---|
| 2,065,121 A | 12/1936 | De Laney et al. | |
| 2,128,128 A | 8/1938 | Evans | |
| 3,056,538 A | 10/1962 | Owsen | |
| 3,578,221 A | 5/1971 | Lukesch | |
| 3,976,216 A | 8/1976 | Lambert | |
| 3,977,575 A | 8/1976 | Macquire-Cooper | |
| 4,003,489 A | 1/1977 | Bingaman | |
| 4,019,629 A | 4/1977 | Dubner et al. | |
| 4,280,634 A | 7/1981 | Wiesenberger et al. | |
| 4,392,578 A * | 7/1983 | Fipp .................. | B65D 81/2076 215/231 |
| 4,410,110 A | 10/1983 | Del Bon et al. | |
| 4,428,478 A | 1/1984 | Hoffman | |
| 4,473,174 A * | 9/1984 | Heuser ................. | B67D 1/0412 215/311 |
| 4,475,576 A * | 10/1984 | Simon ...................... | C12H 1/16 141/302 |
| 4,477,477 A * | 10/1984 | Arter .................. | B65D 81/2053 141/70 |
| 4,763,803 A | 8/1988 | Schneider | |
| 4,845,819 A | 7/1989 | Kyomen et al. | |
| 4,911,314 A | 3/1990 | Schneider | |
| 4,942,967 A | 7/1990 | Schneider | |
| 4,989,745 A | 2/1991 | Schneider | |
| 4,998,633 A | 3/1991 | Schneider | |
| 5,031,785 A * | 7/1991 | Lemme ................. | B65B 31/047 141/65 |
| 5,215,129 A * | 6/1993 | Berresford ............ | B65B 31/047 141/65 |
| 5,465,857 A | 11/1995 | Yang | |
| 5,535,900 A | 7/1996 | Huang | |
| 5,924,338 A | 7/1999 | Peck | |
| 6,595,109 B2 * | 7/2003 | Liebmann, Jr. ....... | B65B 31/046 141/59 |
| 6,651,834 B2 * | 11/2003 | Wong .................. | B65D 81/2038 116/266 |
| 6,874,545 B1 | 4/2005 | Larimer et al. | |
| 6,886,605 B2 | 5/2005 | Luis | |
| 6,976,669 B2 | 12/2005 | Van Zijll Langhout et al. | |
| 7,032,364 B2 * | 4/2006 | Yoshida ............. | B65D 39/0052 53/403 |
| 7,454,883 B2 * | 11/2008 | Hoyt ........................ | B67B 7/08 53/431 |
| 7,562,794 B2 | 7/2009 | Van De Braak et al. | |
| 7,611,429 B2 | 11/2009 | O'Neill et al. | |
| 8,123,086 B2 | 2/2012 | Haley | |
| 8,276,625 B2 * | 10/2012 | Dulst .................... | B65B 31/042 141/19 |
| 8,701,910 B1 * | 4/2014 | Michalopoulos .. | B65D 81/2038 141/114 |
| 2005/0142260 A1 * | 6/2005 | Chen ....................... | C12H 1/14 426/392 |
| 2006/0102659 A1 * | 5/2006 | Marr ...................... | C12H 1/16 222/207 |
| 2007/0199615 A1 | 8/2007 | Larimer et al. | |
| 2010/0294395 A1 * | 11/2010 | Pretorius ............... | B65B 31/003 141/3 |
| 2011/0126939 A1 | 6/2011 | Luis | |
| 2011/0130740 A1 | 6/2011 | Levy | |
| 2011/0220606 A1 | 9/2011 | Alipour | |
| 2013/0153685 A1 * | 6/2013 | Michael J. ............ | B01F 5/0428 239/428.5 |
| 2014/0075888 A1 * | 3/2014 | Striebinger ......... | B01F 3/04801 53/432 |

FOREIGN PATENT DOCUMENTS

| | | | |
|---|---|---|---|
| FR | 2526762 A1 * | 11/1983 | .......... B65B 31/047 |
| FR | 2717152 | 9/1995 | |
| WO | 2009/044133 A1 | 4/2009 | |

OTHER PUBLICATIONS

European Patent Office, Extended European Search Report, European Application No. 14763455.4, Oct. 27, 2016, The Hague.

* cited by examiner

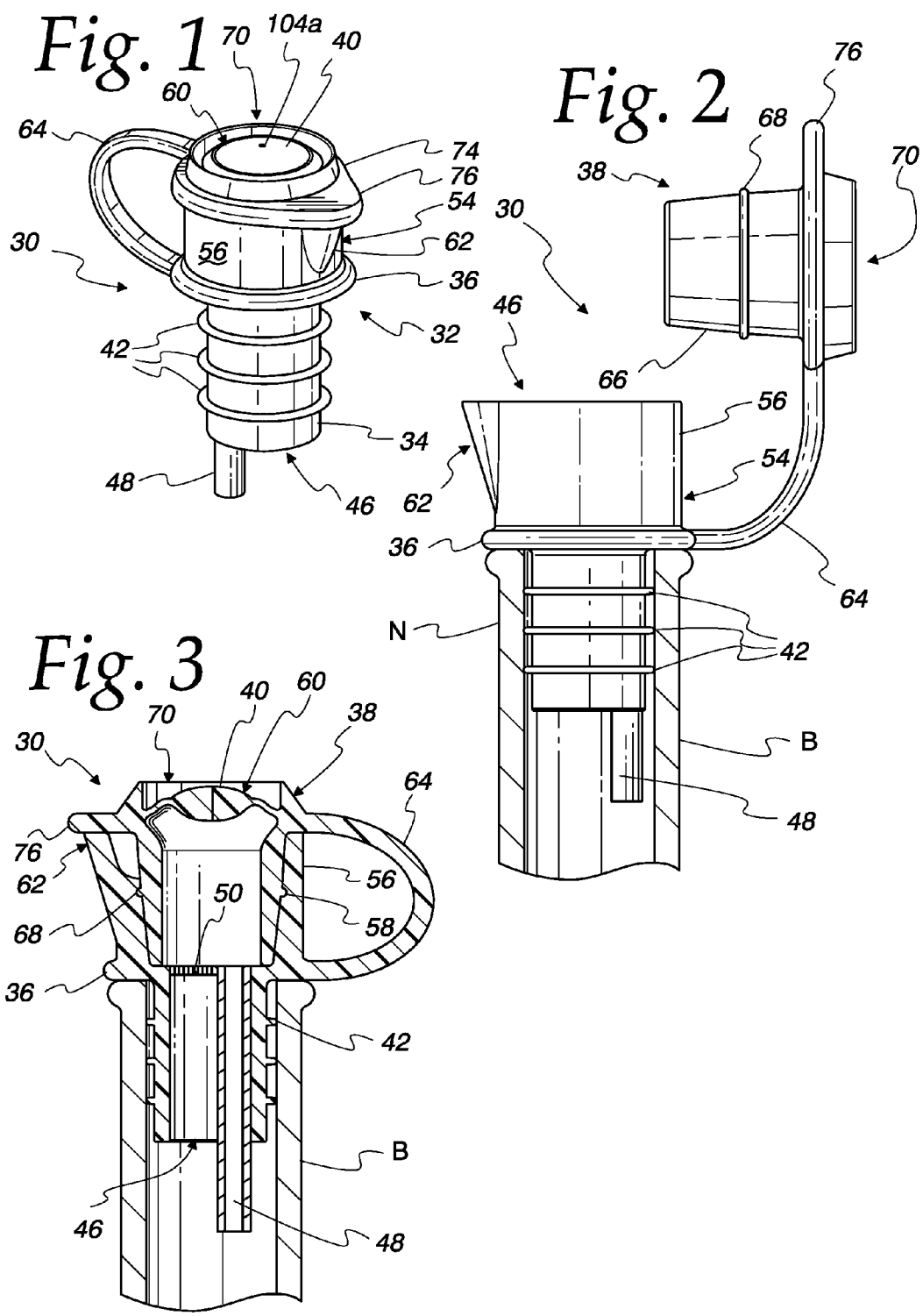

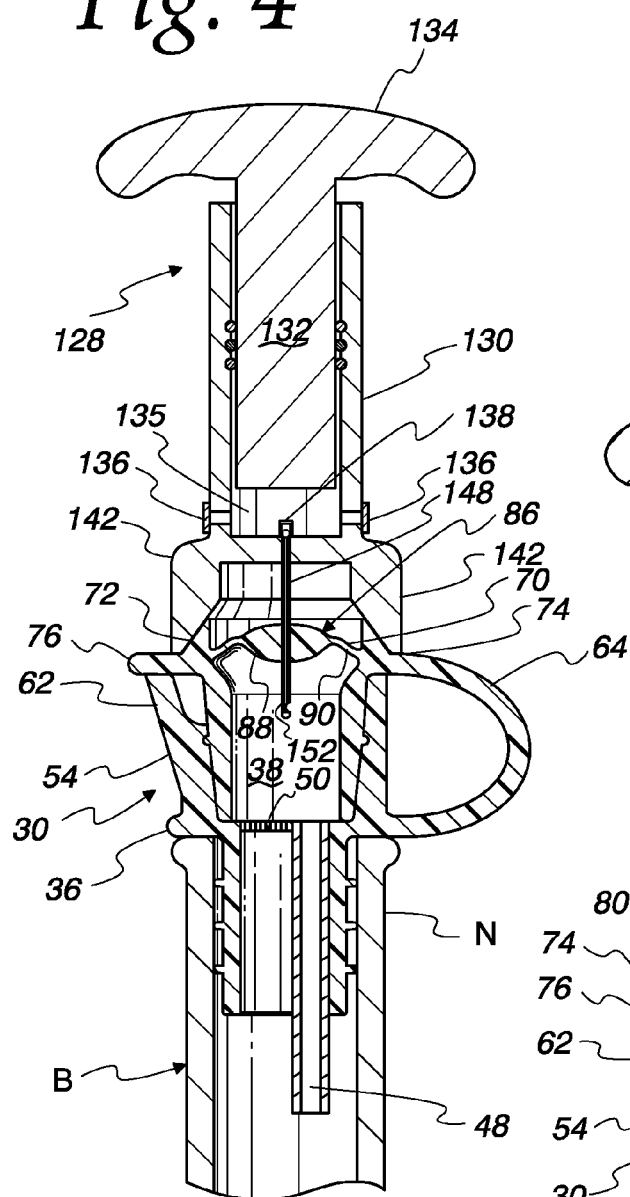
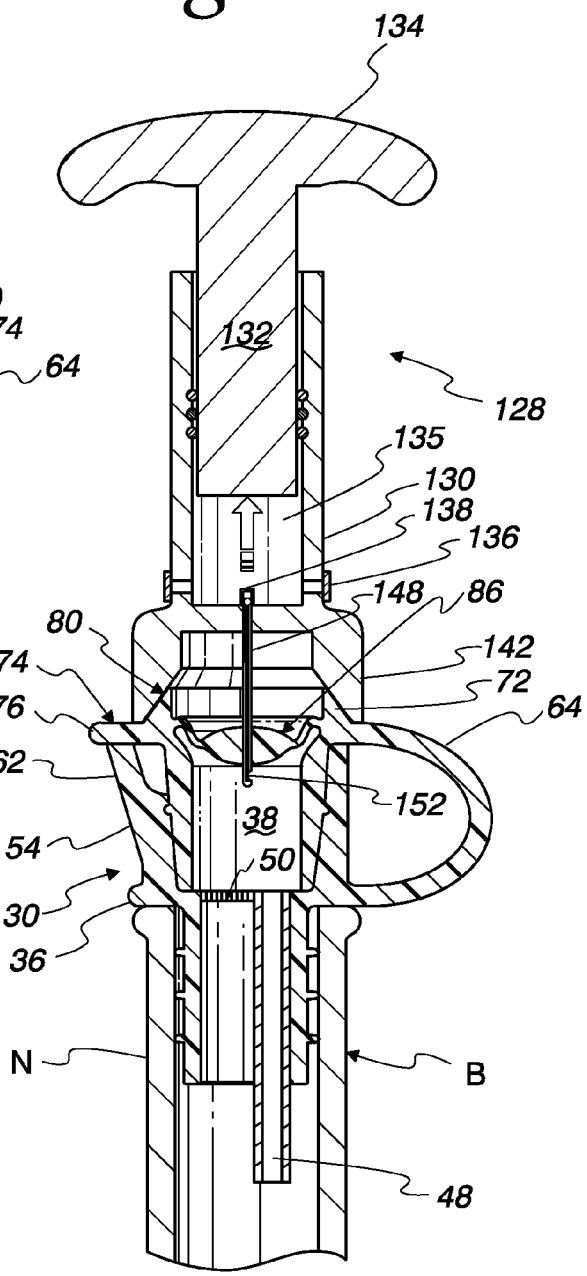

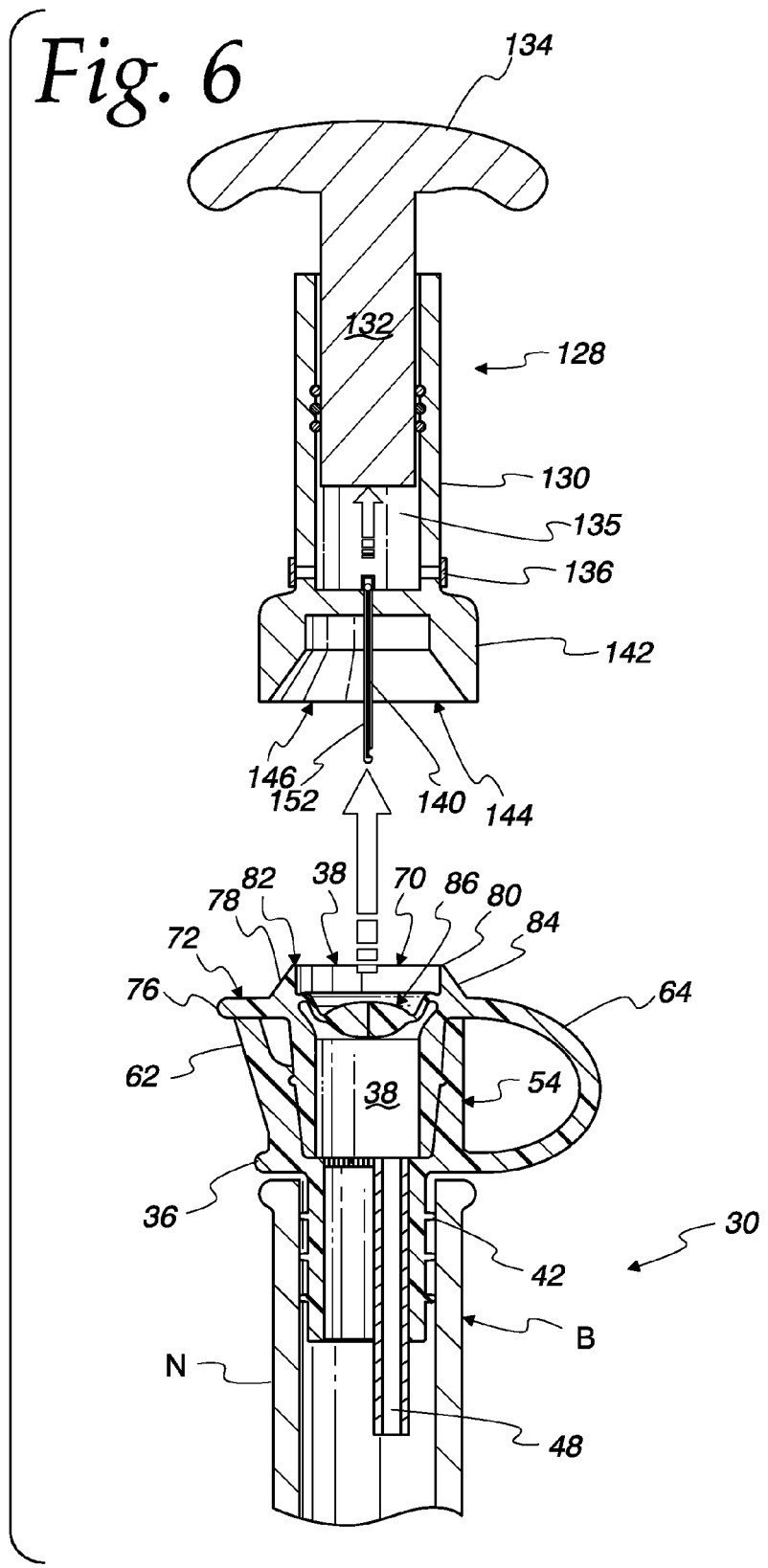

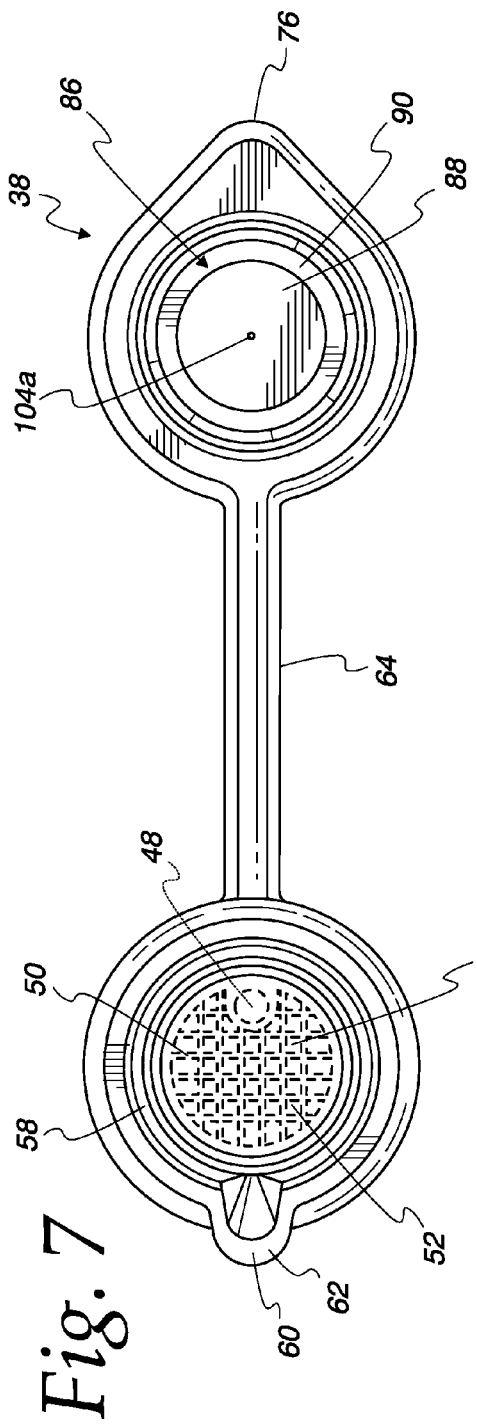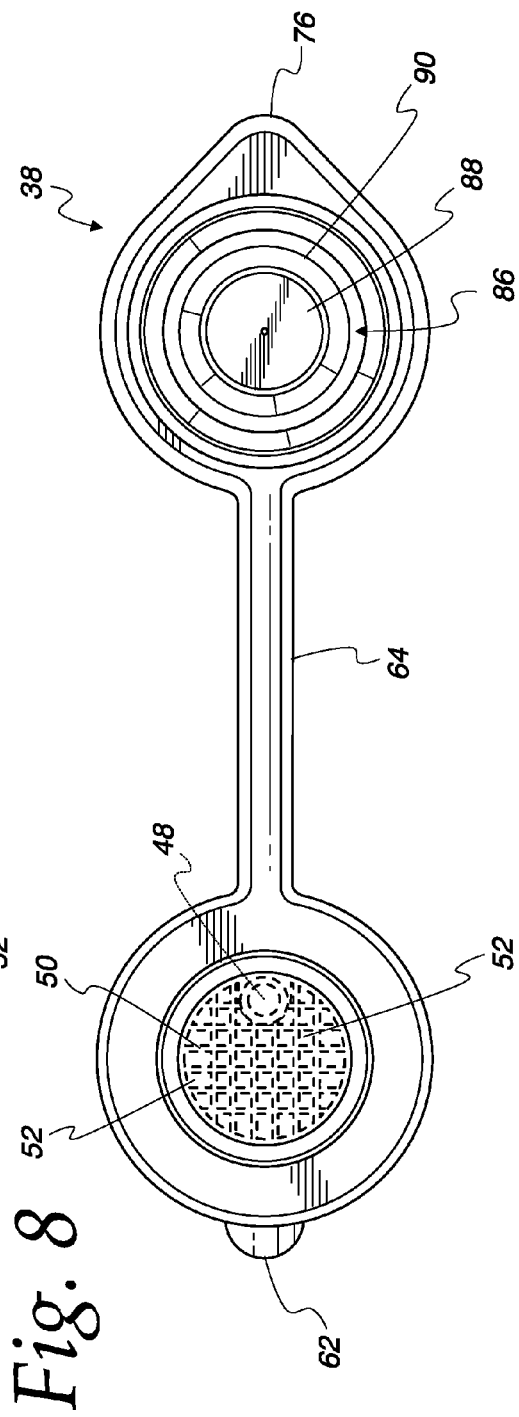

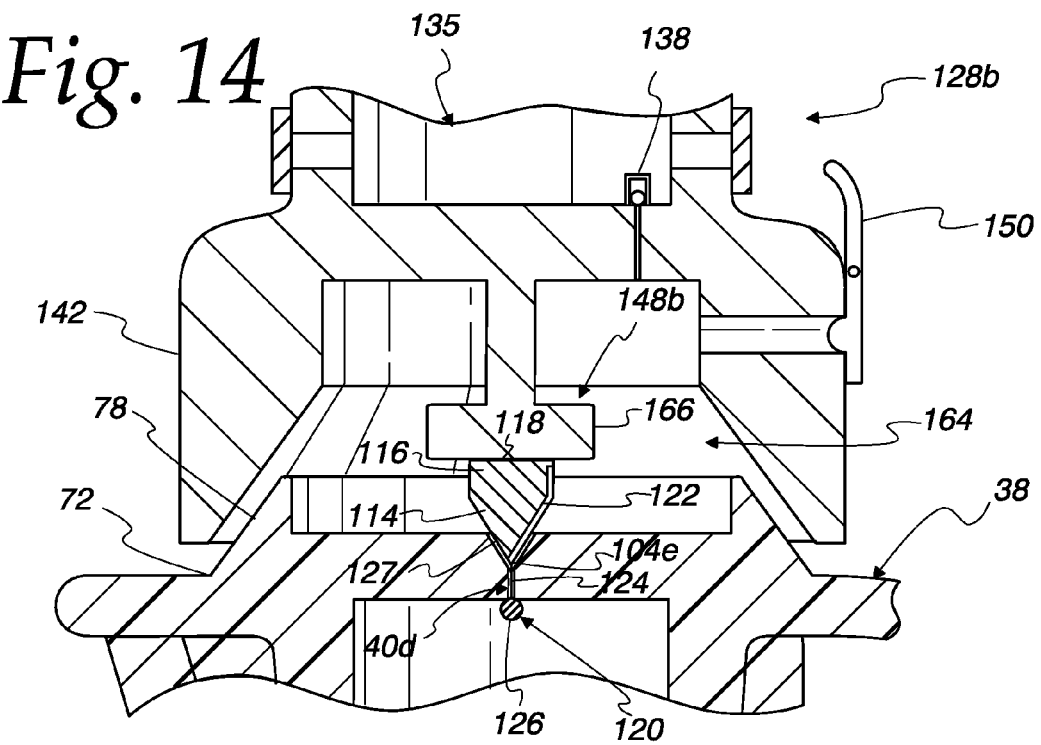
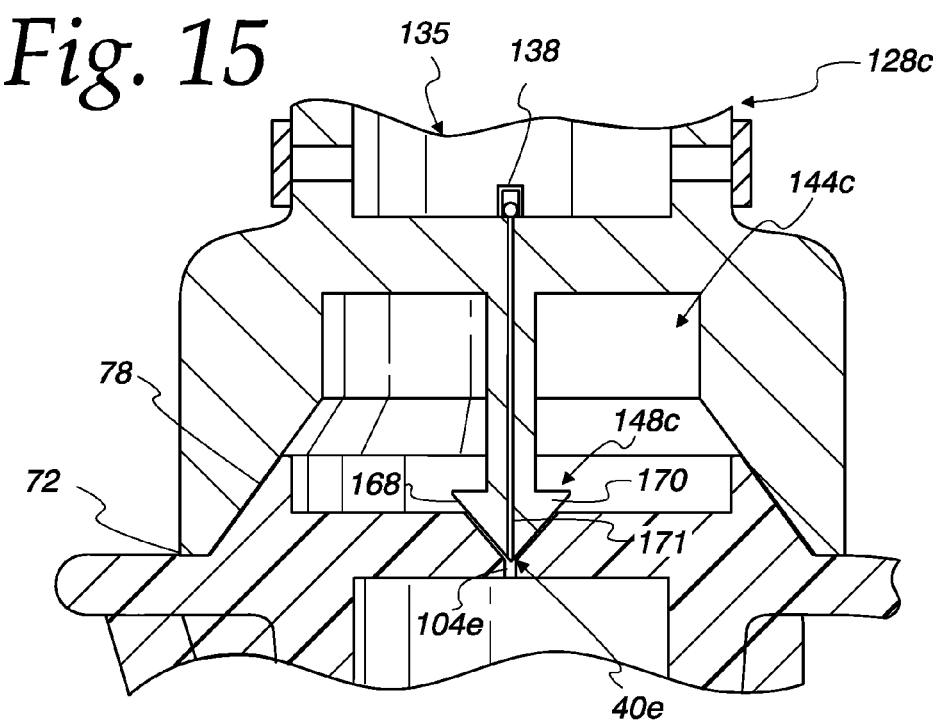

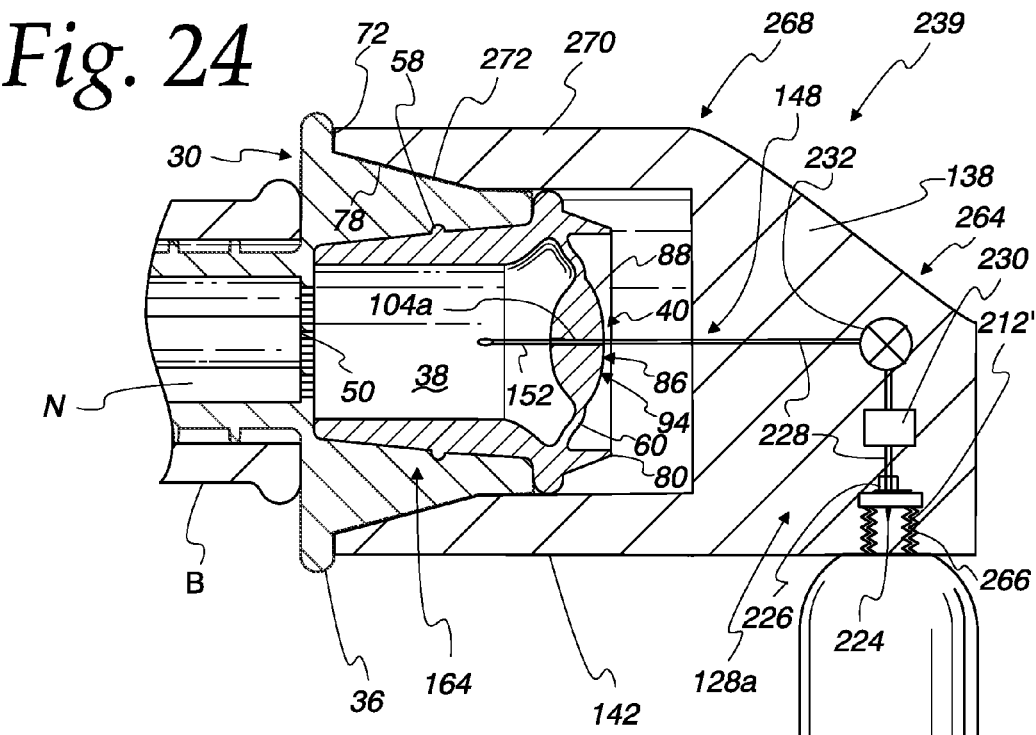
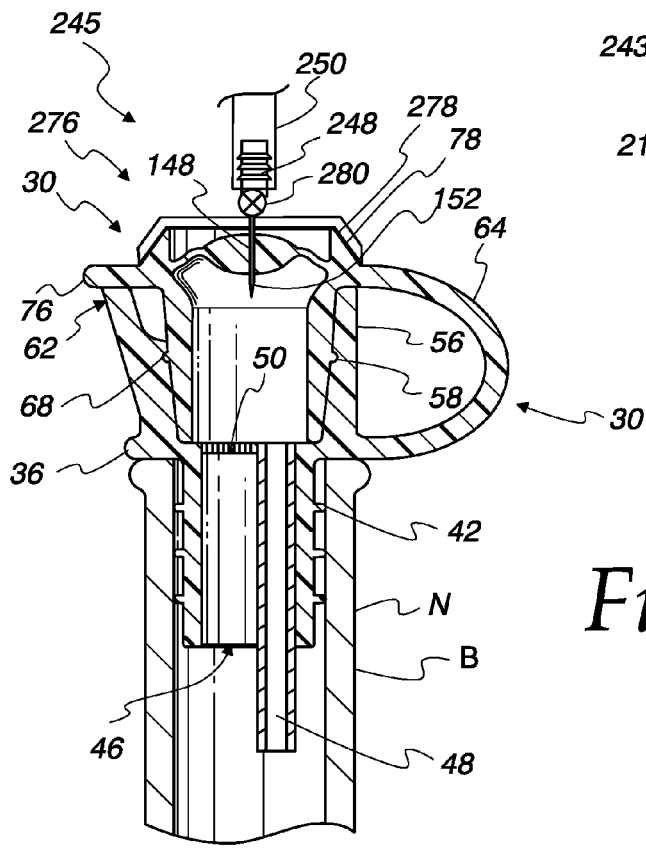
Fig. 24
Fig. 25

VACUUM BOTTLE STOPPER FOR INTRODUCING INERT GAS INTO A WINE CONTAINER

FIELD OF THE INVENTION

The present invention relates to a bottle stopper that is particularly suited for wine contained in bottles, a method of preserving wine and a method of serving wine from a bottle stored under vacuum. The bottle stopper permits air evacuation from the empty portion of the bottle and after evacuation the bottle stopper maintains the vacuum over an extended period of time. More particularly, the present invention relates to a bottle stopper for wine having a removable cap, through which a vacuum in the wine bottle can be achieved and maintained over a storage period. The invention further provides a convenient system and method for replacement of air or other unwanted gas with a desired gas or mixture of gases, which may be an inert gas.

BACKGROUND OF THE INVENTION

Wine, especially vintage wine, is typically bottled in glass bottles as the last phase of the winemaking process. The wine bottle is sealed with an appropriate closure, which may be, for example, a natural or synthetic cork or a screw-top closure. The wine bottle is opened by removing the cork or screw-top closure. When the bottle is opened, air from the external atmosphere enters the bottle. As wine is poured from the bottle for consumption, more air enters the bottle, replacing the wine removed from the bottle.

The introduction of air into the opened wine bottle for a relatively short period of time, such as several hours, for example, is usually not significant. Relatively brief exposure of newly opened wine to oxygen in the air can improve its organoleptic properties. But often, when the entire bottle of wine is not consumed in several hours, for example, but merely closed with the cork, screw-top or other closure member and stored for a period of time, such as overnight, for a day, week or even longer. Storage of a partially consumed bottle of wine in this manner is usually deleterious to the remaining wine. This is because oxygen from the air that has been introduced into the bottle reacts with the wine, adversely affecting the wine's organoleptic properties noticeably over time, sometimes in a day or less. These deleterious effects usually become more noticeable as more time passes before the remainder of the wine is consumed, and can render the wine "undrinkable" by ordinary standards.

Some people may prefer to store a partially consumed bottle of wine with an inert or other atmosphere in the bottle instead of air or a relative vacuum.

A need exists for improved devices and methods for storing partially consumed bottles of wine so that the deleterious effects of oxygen in the bottle can be substantially reduced. A need also exists for a system and method that economically and efficiently allows one to provide an inert gas or other desired gas in place of air or a vacuum.

BRIEF SUMMARY OF THE INVENTION

In accordance with the present invention, an improved bottle stopper and methods are provided that are particularly suited for storing wine in bottles that have been previously opened. The inventive bottle stoppers and methods are also particularly suited for pouring wine from a bottle and resealing and storing the unused portion of wine remaining in the bottle for an extended period of time while avoiding or minimizing deleterious effects on the wine because of exposure to oxygen present in the atmosphere.

In accordance with one aspect of the present invention, a bottle stopper for maintaining a vacuum inside a wine bottle is provided. The inventive bottle stopper has a body composed of a neck portion for insertion into the neck of a wine bottle with the neck portion configured for liquid sealing the neck of the bottle and for maintaining a vacuum inside the bottle. The body of the bottle stopper also includes an upper portion configured to extend above the neck portion. A fluid passageway for pouring wine from the bottle extends through the neck portion and the upper portion of the bottle stopper body. A removable cap is adapted or configured to be inserted into the upper portion of the stopper body to form a closed position that closes the stopper and forms a vacuum-maintaining seal between the cap and the upper portion of the bottle stopper body. The removable cap also includes a vacuum valve having a self-closing valve passageway that extends to the fluid passageway of the bottle stopper. The valve passageway is adapted to be opened by mechanical insertion of a valve opener into the passageway. This allows withdrawal of air or whatever gas is contained within the wine bottle to be evacuated to a desired degree. The evacuation can be accomplished by a suitable vacuum pump or other vacuum source, for example. As used herein, the term "vacuum" does not mean an absolute vacuum, that is, a complete absence of any gas, but rather a partial vacuum, as will be understood by those skilled in the art.

In accordance with another aspect of the invention, the vacuum valve may be an integral part of the cap of the bottle stopper. In addition, the entire bottle stopper, including the cap may be formed as an integral unit by any suitable method, including, for example, injection molding. Consequently, bottle stoppers in accordance with the invention can be reliably and efficiently made.

In addition, bottle stoppers in accordance with the present invention can perform multiple functions including, but not limited to, vacuum storage of wine in wine bottles, recorking wine bottles that have been opened, the ability to open the stopper to pour additional wine from the bottle without removing the stopper from the bottle, filtering the wine as it is being poured, pouring the wine smoothly from the bottle and aerating the wine as it is being poured from the bottle.

In accordance with another aspect of the invention, the stopper cap has an aperture extending therethrough and the vacuum valve is disposed in the cap aperture. In one aspect, at least the cap material that surrounds the cap aperture comprises resilient material and the vacuum valve is mounted in the cap aperture in an interference fit relationship to cause the resilient material surrounding the aperture to exert a radial inward force on the vacuum valve body. This has the beneficial effect of urging the valve passageway to a closed position which helps to facilitate maintaining a vacuum inside the wine bottle.

In accordance with another aspect of the invention, the removable cap further includes a brim or a radially outwardly extending portion that extends beyond the upper portion of the stopper body when the cap is inserted into the upper portion of the stopper body to close the stopper. The brim facilitates opening the cap from the closed position and releasing the vacuum inside the wine bottle by allowing atmospheric air to enter the interior of the bottle.

In accordance with another aspect of the invention, the bottle stopper further includes a pour spout located in the upper portion of the bottle stopper body and the brim is configured as a tab extending over the pour spout and preferably past the pour spout to enable a user to push up on the tab to release any vacuum located inside the wine bottle as well as to open the stopper by removing the cap from within the upper portion of the bottle stopper body.

In accordance with another aspect of the invention, a vacuum indicator is provided as part of the bottle stopper. The vacuum indicator may be an integral part of the bottle stopper and in one embodiment is part of the removable cap. The vacuum indicator is capable of indicating that a desired vacuum has been achieved in the bottle when the bottle stopper is in an operative position inside the bottle and the cap is in the closed position. In one aspect of the invention, the vacuum indicator can be located in a top portion of the cap and includes a flexible region in the top of the cap that circumscribes a region that includes the vacuum valve opening and permits the circumscribed region to be deflected relatively inwardly towards the neck portion (and the interior of the bottle) when the stopper is mounted on a bottle and there is a vacuum in the bottle, and the circumscribed region is not relatively deflected inwardly in the absence of a vacuum in the bottle. In one embodiment, the vacuum indicator comprises a relatively thinner portion in the top of the cap that circumscribes the vacuum valve and/or the vacuum valve opening allowing the circumscribed region to be deflected relatively inwardly as previously described in the top of the cap.

In accordance with another aspect of the invention, a vacuum bottle stopper kit is provided. The vacuum bottle stopper kit is composed of a bottle stopper as previously described and a vacuum pump having a mechanical insertion member for opening the vacuum valve. The vacuum valve is used for evacuating the interior of a wine bottle through the valve passageway when the bottle stopper is mounted in the wine bottle and the cap is in the closed position.

The bottle stopper kit may further include a bottle stopper as previously described that includes a vacuum indicator in the cap where the vacuum valve is located in the top portion of the cap and the vacuum indicator comprises a flexible region in the top of the cap that circumscribes a region that includes the vacuum valve opening, which region may have less flexibility than the flexible region, and permits the circumscribed region to be deflected relatively inwardly towards the neck portion when the stopper is mounted on a bottle and there is a vacuum in the bottle and the circumscribed region is not relatively deflected inwardly in the absence of a vacuum in the bottle. The mechanical insertion member may comprise a hollow needle having a marking, the needle insertable into the valve passageway, the marking being disposed within the valve passageway in the absence of a vacuum in the bottle so that it is not visible to the user. The vacuum indicator is movable relative to the hollow needle so that the marking is revealed and observable by a user by movement of the vacuum indicator in the cap inwardly and relative to the hollow needle in response to the vacuum pump forming a vacuum in the bottle.

In accordance with another aspect of the invention, a method of evacuating and storing wine in a wine bottle having an opening is provided. The method includes providing a bottle stopper in accordance with the invention as described above. The method further includes installing the stopper into the opening of a wine bottle and if the cap is not in the closed position placing the cap of the bottle stopper in the closed position. The valve passageway is opened by mechanically inserting a valve opener into the valve passageway and the wine bottle is evacuated to form a vacuum therein by withdrawing air from the interior of the bottle through the valve passageway. The valve opener is then removed or withdrawn from the valve passageway and the self-closing aspect of the valve passageway causes the valve passageway to close, thereby maintaining the vacuum in the bottle. The evacuation of air or other gas from the wine bottle may include drawing air from the wine bottle through the valve opener. One suitable type of valve opener is a hollow needle, for example.

Where the stopper further includes a pump support and wherein opening the valve passageway and the step of opening the valve passageway further includes guiding the pump onto the pump support such that the valve opener is aligned with and enters the valve passageway.

In accordance with another aspect of the method of storing wine in accordance with the invention, the stopper further includes a vacuum indicator in the removable cap and the method further includes depressing or causing the depression of the vacuum indicator by evacuating the bottle. The depressing of the vacuum indicator can be an indication that sufficient vacuum has been achieved by revealing a sufficient vacuum marking that can be located on the valve opener, which may be a hollow needle. After the interior of the wine bottle has been evacuated and the valve passageway is allowed to close by removing the valve opener from the valve passageway, the wine can be stored in the bottle with a vacuum therein for an extended period of time. Typical extended periods of time can be as desired and may be a period of less than an hour or periods of greater than an hour, a day or more, two days or more and any integer number of days or more, for example, including several weeks. The user can inspect the stored bottle of wine and view the vacuum indicator to provide a ready indication that the interior of the wine bottle is still under vacuum. If it appears that the vacuum has been lost or partially lost, the interior of the wine bottle can be re-evacuated using the stopper and methods as previously described.

In accordance with another aspect of the method of storing wine in accordance with the invention, the method includes introducing inert gas into the evacuated wine bottle. After the introduction of the inert gas, the wine bottle remains under a partial vacuum; preferably, the gas pressure in the bottle is in the range of about 0.6 to about 0.95 atmospheres after the introduction. The inert gas may be introduced through the valve passageway. The inert gas may be selected from the group consisting of nitrogen, carbon dioxide, flavors, fragrances, preservatives and mixtures thereof into the evacuated wine bottle.

In accordance with another aspect of the invention, a method of serving wine from a wine bottle having a vacuum in the interior of the wine bottle with an inventive stopper in accordance with the invention located in the opening or neck of the wine bottle is provided. The method includes at least partially removing the removable cap from the upper portion of the bottle stopper to allow air from the atmosphere to enter the interior of the bottle. The method may further include either removing the bottle stopper in its entirety from the bottle or alternatively by merely completely removing the cap from the upper portion of the bottle stopper, and then pouring wine from the bottle into a desired receptacle. The wine thus may be poured through the body of the bottle stopper including through the upper portion.

In accordance with another aspect of the invention, after the vacuum has been removed and wine has been poured from the bottle, if there is still wine remaining in the bottle that is not desired to be used at that time, the wine bottle can be again evacuated to form a vacuum therein by withdrawing sufficient air from the interior of the bottle through the valve passageway as previously described to provide a desired level of vacuum. Thereafter, the valve passageway is closed by removal or withdrawal of the valve opener and then storing for a period of time the wine remaining in the bottle while under vacuum.

In accordance with another aspect of the invention, a system for introducing inert gas into a wine container for preserving wine in the container is provided. The system includes a bottle stopper having a body composed of a neck portion for insertion into the neck of a wine bottle, the neck portion configured for liquid sealing the neck of the bottle and for maintaining a vacuum inside the bottle. The bottle stopper also has an upper portion extending above the neck portion, and a fluid passageway for pouring wine from the bottle through the neck portion and the upper portion. The bottle stopper also has a removable cap comprising a vacuum valve having a self-closing valve passageway that extends to the fluid passageway, the valve passageway adapted to be opened by mechanical insertion of a valve opener into the passageway. The cap is adapted to be inserted into the upper portion of the stopper body to form a closed position to form a vacuum-maintaining seal and to close the stopper.

In addition to the bottle stopper, the system includes a valve opener for opening the vacuum valve of the bottle stopper; a fitting for mating with a top of a bottle stopper when the bottle stopper is installed in a wine bottle and aligning the valve opener with a valve passageway of the bottle stopper for opening the valve; a pressurized source of inert gas; and a regulator for regulating the pressure of the pressurized source of gas to sub-atmospheric pressure and a passageway for introducing the sub-atmospheric pressure gas to the wine bottle through the valve passageway.

The system may also have a fitting for mating with a top of a bottle stopper when the bottle stopper is installed in a wine bottle and for aligning the valve opener with a valve passageway of the bottle stopper for opening the valve. The system may include a source of vacuum for withdrawing oxygen from the wine bottle through the valve passageway, such as a vacuum pump. The vacuum pump may have the source of inert gas contained within the housing of the pump that permits introduction of the inert gas into a bottle that has been evacuated by the vacuum pump while the pump is in communication with the interior of the bottle. The source of inert gas inside the housing of the pump may be a cartridge containing pressurized inert gas, such as a replaceable cartridge.

In accordance with another aspect of the invention, a kit for evacuating gas from a bottle containing a liquid and for thereafter introducing an inert gas into the bottle is provided. The kit includes a bottle stopper. The bottle stopper has a body composed of a neck portion for insertion into the neck of a wine bottle. The neck portion is configured for liquid sealing the neck of the bottle and for maintaining a vacuum inside the bottle. The bottle stopper has an upper portion extending above the neck portion, a fluid passageway for pouring wine from the bottle through the neck portion and the upper portion, and a removable cap including a vacuum valve having a self-closing valve passageway that extends to the fluid passageway. The valve passageway is adapted to be opened by mechanical insertion of a valve opener into the passageway and the cap is adapted to be inserted into the upper portion of the stopper body to form a closed position to form a vacuum-maintaining seal and to close the stopper.

The kit also includes a vacuum pump having a mechanical insertion member for opening the vacuum valve, the vacuum valve for evacuating the interior of a wine bottle through the valve passageway when the bottle stopper is mounted in the wine bottle; a container having pressurized inert gas therein; and a regulator for regulating the pressure of the pressurized gas in the container to sub-atmospheric pressure and a passageway for introducing the sub-atmospheric pressure gas to the wine bottle through the valve passageway.

The kit may include two or more vacuum bottle stoppers. The vacuum pump may be configured to contain the container of pressurized inert gas and to permit introduction of the inert gas into the bottle from the container.

BRIEF DESCRIPTION OF THE DRAWINGS

FIG. 1 is a perspective view of a first embodiment of a vacuum bottle stopper in accordance with the invention with the cap inserted into the stopper.

FIG. 2 is an elevation view of the vacuum bottle stopper of FIG. 1 illustrated in the open position in the neck of a cross-sectional view of a wine bottle.

FIG. 3 is a cross-section view of the vacuum bottle stopper of FIG. 1 mounted in the neck of a wine bottle.

FIGS. 4 and 5 are cross-section views of the vacuum bottle stopper of FIG. 1 mounted in the neck of a wine bottle and connected to a matching vacuum pump. In FIG. 4, the dome of the bottle stopper's cap is in the "no-vacuum" position, not depressed. In FIG. 5, the dome of the bottle stopper's cap is in the "vacuum" position, depressed.

FIG. 6 is a cross-section view of the vacuum bottle stopper of FIG. 1 positioned in the neck of a wine bottle with the dome of the stopper's cap depressed.

FIGS. 7 and 8 are top and bottom plan views of the vacuum bottle stopper of FIG. 1.

FIGS. 14 and 15 are enlarged cross-sectional views of alternate embodiment valve openers and a vacuum bottle stopper in accordance with the invention.

FIG. 24 is a cross-sectional view of an external supply of inert gas in accordance with the invention for directly providing inert or other gas through the stopper of FIG. 13 with some schematic elements.

FIG. 25 is a cross-sectional view of a connector in accordance with the invention for connecting the inventive vacuum bottle stopper of FIG. 1 to a source of vacuum or to a source of inert or other gas with some schematic elements.

DETAILED DESCRIPTION OF THE INVENTION

In accordance with the present invention, an improved bottle stopper and methods in accordance with the invention are described in detail in this section, with reference to the accompanying figures. In general, when discussing the location of components of the bottle stopper, the stopper is oriented such that it can be installed or is installed in the neck of a wine bottle that is upright with the bottle opening at the top unless indicated otherwise. The entire disclosure of U.S. Pat. No. 8,123,086 ('086 patent) is hereby expressly incorporated by reference. In one aspect of the present invention, the bottle stoppers of the '086 patent are improved by the presence of elements that permit an evacuation of the interior of a wine bottle to form a vacuum in the bottle. In addition, the bottle stoppers of the present invention are capable of maintaining a vacuum in a wine bottle during a storage period of one day, several days or more, for example. Thus, a vacuum seal is maintained between the bottle and the stopper and between the cap and the stopper.

Thus, in one aspect, the inventive bottle stopper of the present invention may have the same or similar features and may have a similar appearance to devices of the '086 patent, but with the addition of the aforesaid functions.

Figure 19:
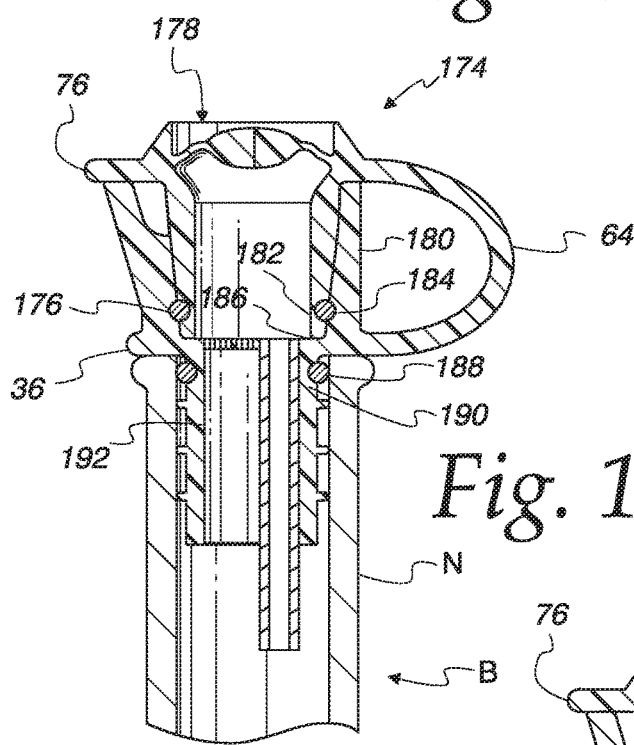
FIG. 19 is a cross-sectional elevation view of another embodiment of the stopper employing o-rings for seals.

Referring to FIGS. 1-8, vacuum bottle stopper 30 represents one embodiment of a vacuum bottle stopper of the present invention. Vacuum bottle stopper 30 has a stopper body portion 32 composed of a neck portion 34, a shoulder portion 36, and a reusable and resealable cap 38, having a vacuum valve 40, along with other components that can optionally be included. Vacuum valve 40 allows the interior of a wine bottle, on which bottle stopper 30 is mounted to be partially evacuated by withdrawal of the air or other gas in the non-liquid part of the contents of the wine bottle using a suitable vacuum pump. This allows the wine to be stored in the partially evacuated bottle. When it is desired to remove wine from the bottle, atmospheric air or other gas is introduced into the bottle through vacuum valve 40 or through some other portion of vacuum bottle stopper 30. Vacuum bottle stopper 30 can be formed as a single integral mass of suitable material or as an assembly of component parts. The various components of vacuum bottle stopper 30 and its methods of operation, as well as other embodiments of the invention are hereafter described in detail. Neck portion 34 is configured for insertion into and to achieve sealing engagement with the open mouth or neck of a wine bottle B. A shoulder portion 36 which prevents stopper 30 from being excessively inserted into wine bottle B and can provide a further vacuum-maintaining seal. Neck portion 34 typically has a plurality of circumferential sealing rings 42, generally 2, 3, 4, 5 or 6, for sealing the interior of the bottle B between the body 34' of neck portion 34 and neck N of the bottle B from outside air infiltration. In addition or in the alternative, neck portion 34 may have one or more o-rings adjacent shoulder portion 36 (as shown in FIG. 19) to promote the airtight sealing of neck N. Neck body 34' of neck portion 34 is preferably substantially cylindrical or substantially frusto-conical with a slight to moderate taper with or without sealing rings 42 to facilitate achieving a good liquid and airtight (vacuum) seal with bottle B. Neck portion 34 has an internal wine passageway 46, preferably substantially cylindrical or substantially frusto-conical, for wine and an air passageway 48 allowing air to enter bottle B during pouring therefrom. Preferably stopper 30 is designed so that wine passageway 46 is substantially coaxial with neck N of bottle B when inserted into a wine bottle while air passageway 48 is located on the side of wine passageway 46 as shown in FIGS. 7 and 8, for example. Air passageway 48 extends downwardly of wine passageway 46 and preferably down to a shoulder portion of the wine bottle B when the stopper is fully inserted into neck N in its operative position.

Air passageway 48 extends upwardly to or beyond a filter 50. Filter 50 has a plurality of regularly spaced, filter apertures 52 in an array. Filter apertures may be square, round, oval or rectangular as desired. Filter apertures are sized to retain precipitates in wine while allowing the wine to pass through easily. The dimension of aperture 52 is preferably about 0.04 inches or less (dimension of side in the apertures shown). Filter 50 may be located within neck portion 34 or within an upper portion 54 of stopper 30 or at the transition of neck portion 34 to upper portion 54. Preferably, filter 50 is located within upper portion 54 substantially level with shoulder portion 36.

Wine passageway 46 extends through upper portion 54. Upper portion 54 may be any appropriate shape such as, for example, circular, triangular, square, hexagonal or irregular cross-sectional shapes. Generally, upper portion 54 is wider than neck portion 34. Upper portion 54 has a sidewall or sidewalls 56, a sealing groove 58 and visual indicator 60 that signals the user which side of the stopper to pour from (preferably air passageway 48 is on top during pouring), in this embodiment comprising a spout 62. Typically and as shown, visual indicator 60 is substantially diametrically opposed from air passageway 48. Visual indicator 60 may alternatively comprise a protuberance or other marking to indicate a preferred orientation of wine bottle B during pouring. In particular, during pouring, wine bottle B is tipped such that visual indicator 60 is oriented downwardly and air passageway 48 upwardly so that air rather than wine passes into the bottle through air passageway 48. This orientation provides a smooth pour and aeration of the wine being poured.

The construction, functions and operation of cap 38 are now described. Preferably, and as illustrated, cap 38 is attached by any suitable structure to stopper 30 to prevent the cap from being misplaced. Cap 38 may be attached by a strand 64 or one or more strands, a chain, a wire hook arrangement, or any other suitable structure. Preferably strand 64 is attached to shoulder portion 36 diametrically opposed to visual indicator 60 so that cap 38 does not interfere with wine pouring. Cap 38 has an insertion body 66 preferably allowing mating insertion into and sealing of wine passageway 46 of upper portion 54. Insertion body 66 has the same or essentially the same or slightly larger (for a tighter fit and a better seal) cross-sectional shape as wine passageway 46 and may be slightly conical as shown in FIG. 2 for a tighter fit. Cap 38 also has a sealing ring 68 which in combination with sealing groove 58 provides a seal when cap 38 is seated in wine passageway 46. Alternatively, cap 38 may have a sealing groove and upper portion 54 has a sealing ring. It is to be understood that sealing ring 68 may be integral to cap 38 (or upper portion 54) or may be present as separate (not integral) o-ring. Alternatively or in addition, upper portion 54 may have an o-ring, which may be supported by filter 50, which o-ring is compressed by cap 38 providing a further seal when cap 38 is seated in wine passageway 46.

As shown in FIGS. 4 and 5, cap 38 also has a top 70 that can include a pump base support 72 comprising circumferential brim 74. Alternatively, pump base support 72 may comprise shoulder portion 36 or another shoulder not shown, or a vacuum pump can be remotely connected to vacuum valve 40 by a flexible hose, for example. Brim 74 may be in the shape of a ring with an outwardly extending tab 76 for covering spout 62 and for facilitating the removal of cap 38 from wine passageway 46. Upper portion 54 extends between shoulder portion 36 and brim 74 preferably more than about 0.25 inches (6 mm) and more preferably more than about 0.5 inches (12 mm) so that a thumb can easily engage and push up on brim 74 and more particularly tab 76 to unseat cap 38 releasing vacuum in bottle B and to open stopper 30 by removing cap 38 from upper portion 54. Spout 62 preferably provides a passageway for air to enter bottle B to release vacuum as cap 38 is removed. Preferably strand 64 is attached to brim 74 diametrically opposed to tab 76.

Figure 13:
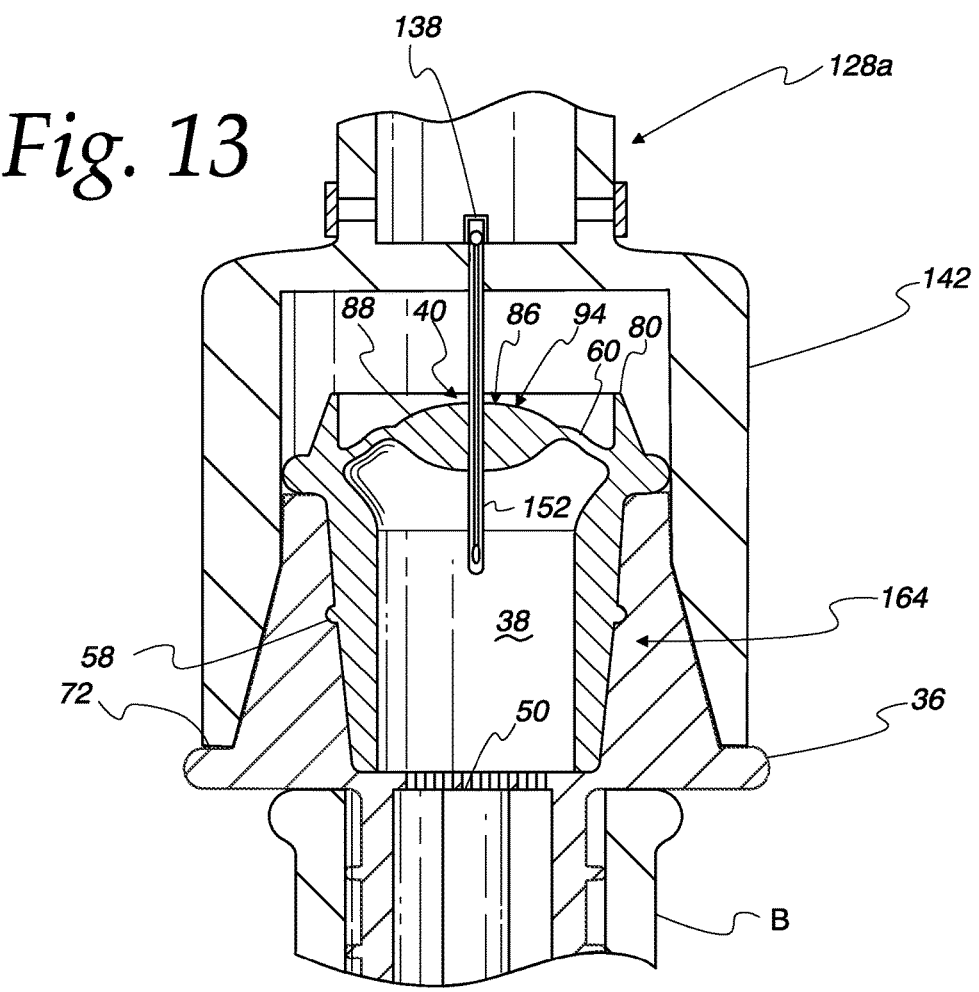
FIG. 13 is a cross-sectional view of the vacuum bottle stopper of FIG. 1 having a vacuum pump with a recessed needle inserted into the bottle stopper.

Stopper 30 may also have a pump locating guide 78, which as illustrated in FIGS. 4-6 comprises raised ridge 80 on cap 38. Alternatively, pump locating guide 78 may comprise brim 74 when pump support 72 comprises shoulder portion 36 as illustrated in FIG. 13. Ridge 80 may have a circular, triangular, square or hexagonal shape, preferably matching the shape of horizontal cross-section of upper portion 54. Ridge 80, as illustrated in FIGS. 5 and 6, has a profile 82 with a slope 84 on the exterior side and is substantially vertical on the interior side. Alternatively or in addition to slope 84, profile 82 may have a slope on the interior side. Slope 84 is helpful in locating and securing a matching pump on top 70 of cap 38 during evacuation pumping of the interior of a wine bottle. It is to be understood that a pump locating guide could be provided that is the inverse of the one described, i.e., a depressed area instead of a raised area on ridge 80.

Cap 38 may have and as illustrated in FIGS. 4-13 and 16-17, does have a visual vacuum indicator 86. Vacuum indicator 86 has an inner portion 88 and an outer portion 90. Ridge 80 may surround indicator 86, but it could also be located partially on inner portion 88. Inner portion 88 has a vacuum valve 40 and is preferably substantially circular. Outer portion 90 is preferably substantially annular. Indicator 86 has two or more positions or states. In a normal position or state 94 when bottle B is not under vacuum, indicator 86 is not depressed and may be configured to have the appearance of a dome. In a vacuum-indicating position or state 96, indicator 86 has been depressed or pulled inwardly by the vacuum, indicating that a partial or sufficient vacuum is in bottle B to properly preserve the wine. Advantageously, vacuum-indicating state 96 can be readily observed by a wine consumer during pumping and during storage. Preferably, indicator 86 achieves the vacuum-indicating or depressed state 96 at a vacuum of greater than about 8 psig (an actual pressure inside the wine bottle of about 6.7 psi (pounds per square inch), preferably greater than about 9 psig, more preferably greater than about 10 psig, and most preferably greater than about 11 psig (an actual bottle pressure of about 3.7 psi). Indicator 86 may have additional states responsive to the vacuum level in bottle B. Outer portion 90 is flexible so that indicator 86 can achieve depressed state 96 in response to achievement of the desired vacuum in the bottle. Preferably, inner portion 88 is relatively inflexible so as to maintain a proper seal for the vacuum valve. Outer portion 90 may be thicker than inner portion 88 to achieve the desired relative inflexibility. Outer portion 90 in addition or in the alternative may include a more resilient material than inner portion 88 such as a suitable non-elastomeric plastic or a suitable metal, preferably food-grade.

As previously briefly described, cap 38 has valve 40 in top 70. Valve 40 is surrounded by ridge 80. Typically, valve 40 is located so that it is substantially coaxial with neck N of bottle B and indicator 86 when stopper 30 is in operative position in bottle B. Valve 40 is preferably self-sealing for permitting a vacuum pump 128 to draw a vacuum in the wine bottle B and for maintaining the vacuum in bottle B when vacuum pump 128 is withdrawn.

Figure 9:
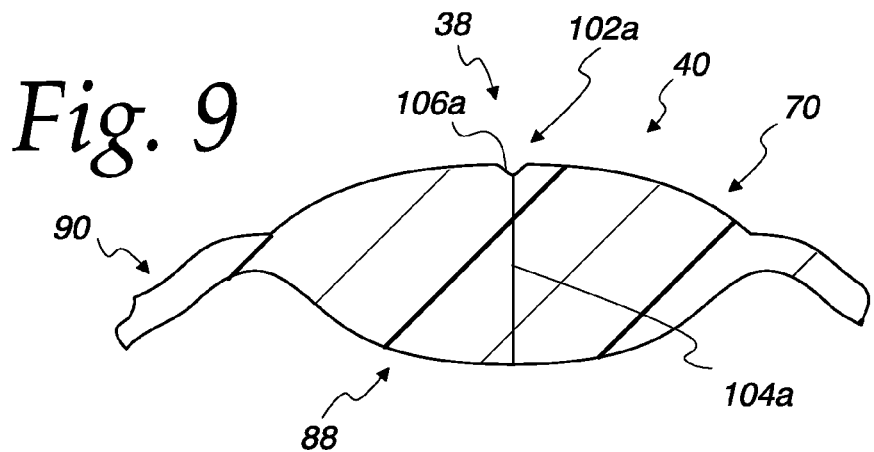
FIGS. 9-12 are enlarged cross-sectional fragmentary views of various vacuum valves that can integrally form part of the vacuum bottle stopper in accordance with the present invention.

Valve 40 is shown in FIG. 9 and as a substitute any of valves 40a, 40b, 40c, and 40d as illustrated in FIGS. 10-12 and 14 may be used. Stopper 30 is illustrated in FIGS. 1-8 with valve 40. Valves 40, 40a, 40b, 40c, 40d have an opening 102a, 102b, 102c, 102d, 102e, respectively, connected to valve passageway 104a, 104b, 104c, 104d, 104e, respectively. Openings 102a, 102b, 102c and 102d preferably have a tapering section 106a, 106b, 106c and 106d, respectively. Preferably, sections 106a, 106b, 106c and 106d are substantially conical. Passageways 104a, 104b, 104c, and 104d are self-sealing so that stopper 30 can hold a vacuum without a manual valve closing.

Figure 10:
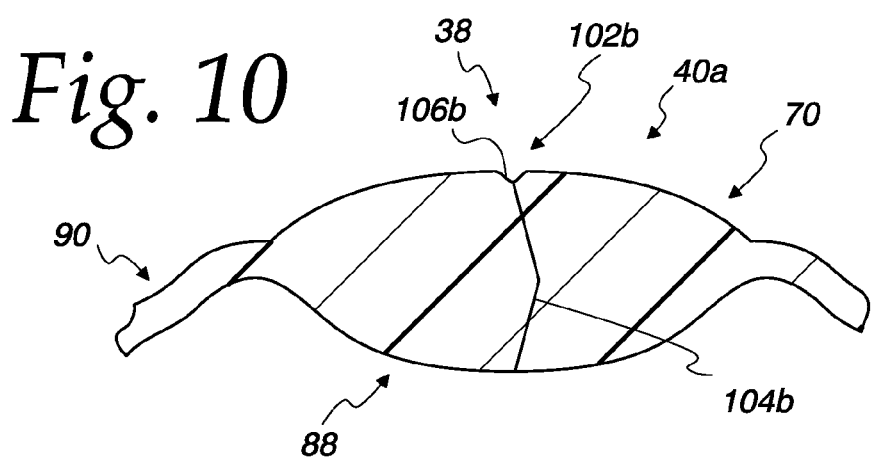
Figure 11:
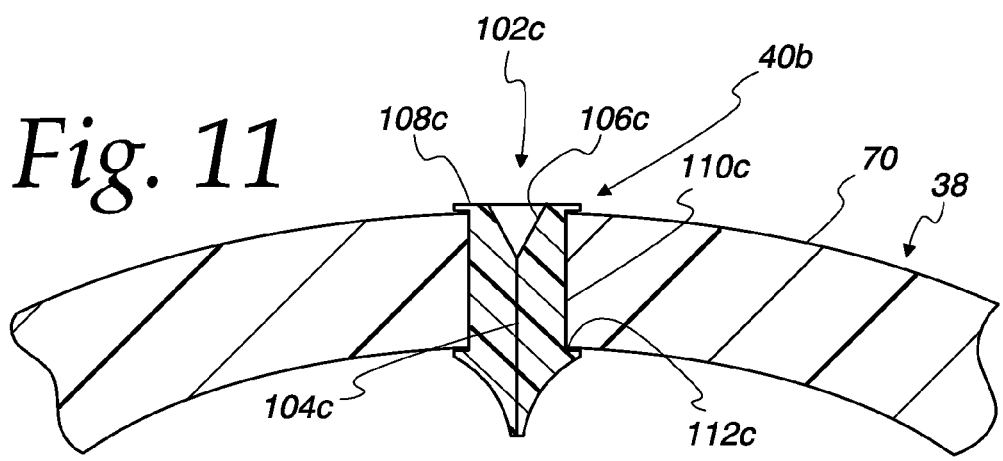
Figure 12:
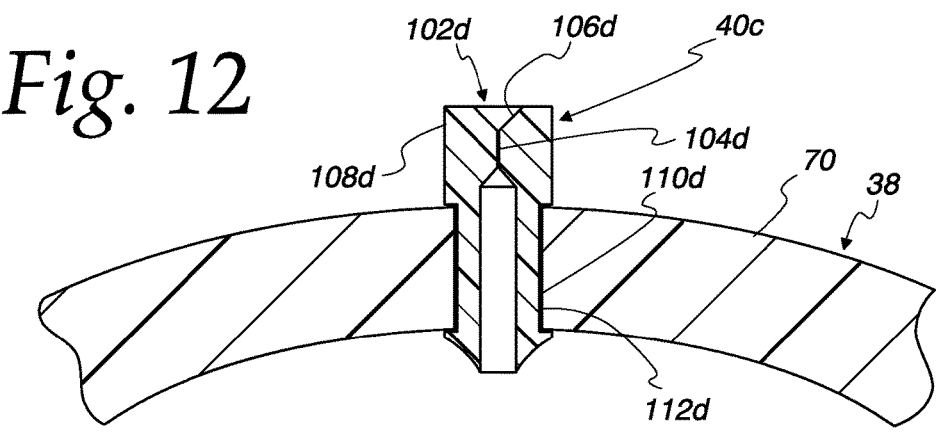

As shown in FIGS. 9, 10, 14 and 15, valves 40, 40a, 40d, and 40e are integral to stopper 30. Valves 40b and 40c are not integral to stopper 30 as shown in FIGS. 11 and 12. Valves 40b and 40c may be a sports ball inflation valve, for example, such as those used on footballs and basketballs, or variations thereof, and have valve bodies 108c and 108d which are installed into openings 110c and 110d, respectively, in top 70 of cap 38. Valve bodies 108c and 108d have recesses 112c and 112d, respectively, so that they can be tightly seated in an interference fit and/or with adhesive in opening 110c and 110d, respectively, thereby promoting maintenance of a vacuum seal. In that regard, cap 38 or at least the portion having openings 110c and 110d and surrounding valves 40b and 40c is made of a resilient material so that a radial inward force is exerted on valve bodies 108c and 108d to help maintain a vacuum seal therebetween and on valve passageways 104c and 104d, to help maintain those valves closed in a vacuum-maintaining position. Valve passageways 104 are long enough to provide a good seal to maintain the desired vacuum in the bottle.

The valves for use in the present invention may be made by any suitable method, including injection molding. The valve passageway in such valves may be made as part of the injection molding process or the passageway can be formed subsequently, such as by insertion of a thin needle or other suitable tool. The material of all, or of the valve portion and valve indicator portion, of the bottle stopper cap may be formed of a food grade resilient material. In the production process, the material of the cap or that portion advantageously may be made so that the material exerts a resilient force directed radially inwardly towards the valve passageway and preferably generally in a direction normal to the length or longitudinal axis of the passageway. Such an arrangement helps maintain a vacuum in the bottle over an extended period by reducing or avoiding air infiltration from the atmosphere into the bottle. Similarly, the cap and upper stopper body may be dimensioned so that a slight interference fit between the cap and the stopper body is achieved (i.e., by making the outer cap diameter slightly large than the interior passageway of the upper portion of the stopper) to facilitate forming a vacuum and liquid resistant seal therebetween to prevent air infiltration with the bottle and to prevent liquid from leaking out of the bottle.

A potential advantage of valve 40b and 40c is that the length of passageway 104c and 104d is not limited by the thickness of top 70 and more specifically the thickness of inner portion 88 where valve 40b is preferably installed. However, the thickness of inner portion 88 adjacent valves 40, 40a, and 40d may be greater than the thickness elsewhere in inner portion 88 affording longer passageways 104a and 104b, and consequently, a better seal. Passageways 104 may be straight as shown in FIGS. 9, 11, 12 and 14 or non-straight, e.g., crooked, as shown in FIG. 10, which exaggerates the crookedness for ease of viewing. An advantage or distinction of valve 40c is that it has a higher tapering section 106d than valve 40b such that valve 40c is raised relative to top 70. More particularly, section 106d and passageway 104d can be above pump base support 72. This could have the advantage of allowing parts of the vacuum pump to be recessed as will be discussed later. Integral valves 40 and 40a may be raised by having them integrated into a raised portion which is raised relative to top 70 and inner portion 88 and which is preferably located within inner portion 88. Alternatively, top 70 or portions of top 70 can be raised relative to brim 74 so that components of the vacuum pump are recessed and pump locating guide 78 would comprise the side or sides connecting brim 74 to raised top 70 or raised portion of top 70. Alternatively, rather than pump support 72 comprising brim 74, pump support 72 can comprise shoulder portion 36, or another shoulder (not shown), as shown in FIG. 13 and pump guide 78 can comprise sidewall 56 of upper portion 54.

Valve 40d, illustrated in FIG. 14, has a valve opener 114 installed inside section 106d and passageway 104d. Valve opener 114 has a body 116, top 118 and retention device 120. Body 116 is preferably substantially conical or has a shape matching section 106d except for vertically-extending recess 122. Recess 122 may have a substantially rectangular profile as shown or a curved profile which can be substantially a semi-circle or a semi-oval. Top 118 may be in the form of a dome or as desired. Retention device 120 has a rod 124 and a bottom portion 126. Rod 124 has a length longer than valve passageway 104e and a width wider than the natural (unstretched) width of valve passageway 104d so that a seal is formed around rod 124. Bottom portion 126 has a width sized so that valve opener 114 is retained within valve 40d. Valve opener 114 is wider than rod 124. Bottom portion 127 of valve opener 114 may taper at its very bottom to facilitate insertion of valve opener 114 into valve 40e. Valve 40e and valve opener 114 may be made of any suitable material including a food-grade metal or plastic and preferably one that facilitates movement of valve opener 114 relative to valve 40e, for example, a non-elastomer fluorinated plastic like Teflon®, for example.

As shown in FIGS. 4-6, vacuum bottle stopper 30 and vacuum pump 128 are configured to work together. Vacuum pump 128 is preferably of the manual, piston kind. Pump 128 as illustrated in FIGS. 4-6 has a body 130. Body 130 contains a piston 132, piston handle 134 for grasping by the hand of a user, and chamber 135. Pump 128 also has an exhaust valve 136 for exhausting air withdrawn from bottle B during a pump downstroke and a valve 138 for preventing air from being pushed back into bottle B during the downstroke. Valve 138 is within passageway 140. Pump 128 has a base 142 that is configured to mate on top of pump support 72 during evacuation of bottle B. Base 142 has a cavity 144 and shape 146 matching the shape of pump guide 78 such that guide 78 guides pump 128 onto pump support 72 and supports and secures pump 128 during pumping. Base 142 may be made of a clear material while pump body 130 may be made of an opaque material. A clear material would allow a user to observe vacuum indicator 86 even while vacuum pumping. Pump 128 also has a valve opening mechanism 148.

Vacuum pump 128 may have optional components. It may have a vacuum release 150 for releasing vacuum from bottle B. Vacuum release 150 may be manually or automatically actuated when there is excessive vacuum in the pump 128 and bottle B. Pump 128 may have a vacuum indicator, visual, audible or both, for indicating whether a desired vacuum has been achieved. Release 150 may make an audible noise when it opens automatically indicating that sufficient vacuum has been achieved. More generally, vacuum release 150 may comprise an audible vacuum indicator or a visual vacuum indicator that is actuated by the automatic actuation of vacuum release 150.

Figure 16:
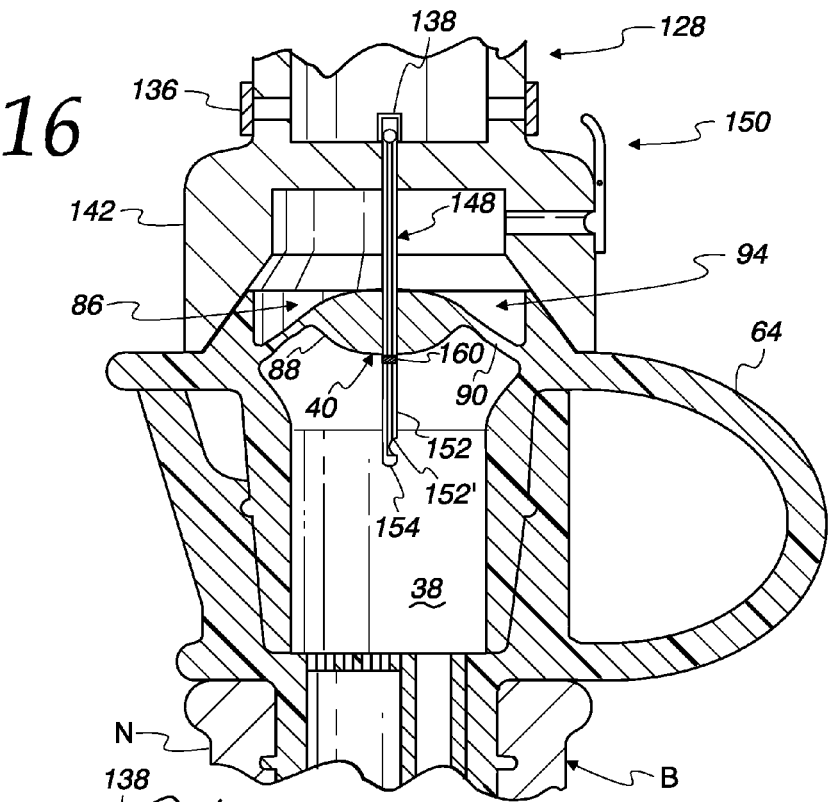
FIGS. 16 and 17 are enlarged sectional views corresponding to FIGS. 4 and 5, respectively, illustrating a needle having a marking for indicating the vacuum level in a bottle.
Figure 17:
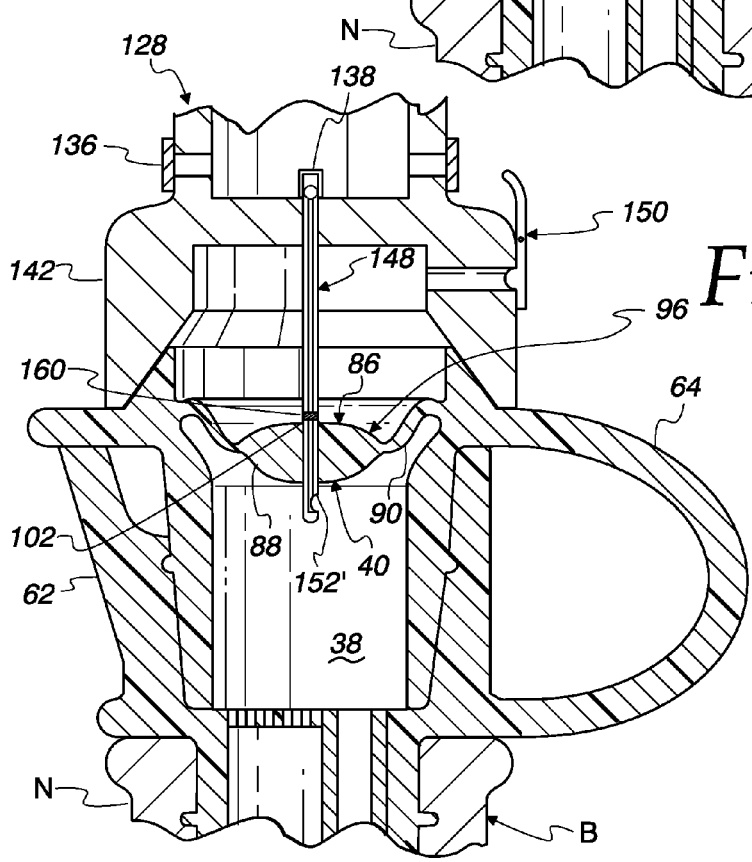

Vacuum pump 128 has different embodiments depending in part upon the valve used in stopper 30. As illustrated in FIGS. 4-6 and 16, a vacuum pump 128 has a hollow needle 152 for use with valves 40, 40a, 40b and 40c. Valve opening mechanism 148 comprises needle 152. Needle 152 has a tip 154 which, when inserted into valves 40, 40a, 40b and 40c, is guided into valve passageway 104a, 104b, 104c, 104d by tapering section 106. Needle 152 is hollow and has sufficient length that it extends through valve passageway 104a-d, when vacuum indicator 86 is in its normal state 94. Needle 152 has an interior passageway 152' for connecting the interior of bottle B to pump chamber 135. Needle 152 has a base, preferably threaded for attachment and removal to pump 128. Needle 152 may be a sports ball needle. Needle 152 may have one or more gauge markings 160 as shown in FIGS. 16 and 17. Markings 160 may be in the forms of bands of colors, lines, and other indicia for indicating the vacuum level in bottle B. In its simplest embodiment, needle 152 may have a single marking 160; when valve opening 102 is above marking 160 (e.g., when vacuum indicator 86 is in normal state 94) as illustrated in FIG. 16, insufficient vacuum has been achieved for storage. Marking 160 becomes apparent (is above valve opening 102) when vacuum indicator 86 is in depressed state 96 indicating that sufficient vacuum has been achieved for storage as illustrated in FIG. 17. As shown in FIGS. 16 and 17, needle 152 may have additional markings 160 to indicate, for example, that some but insufficient vacuum has been achieved or that excessive vacuum may have been achieved.

Needle 152 may be principally made of any suitable metal such as food grade stainless steel. Needle 152 may have a slippery or non-stick coating or material for contact with valve passageway 104 to facilitate movement of vacuum indicator 86 in response to different vacuum levels. The non-stick coating or material may comprise a suitable fluorinated polymer such as Teflon®, for example.

Referring to FIGS. 4-6, one advantage of pump 128 is that base 142 need not form a seal with stopper 30 as there is a seal formed between needle 152 and valve passageway 104. Consequently, a variation of pump 128, pump 128a illustrated in FIG. 13, has a first slit (not shown) for accommodating strand 64 and a second slit (not shown) for accommodating tab 76 because pump support 72 comprises shoulder portion 36. Preferably, needle 152 is completely recessed within cavity 164. Having needle 152 fully recessed is advantageous because needle 152 is protected from being accidentally bent, permits pump 128a to be stored on its base 142, and protects users from being accidentally poked by needle 152, although it has a blunt, not a sharp tip.

Pump 126b (illustrated in FIG. 14) has a pusher 166 in cavity 164 for pushing valve opener 114 of valve 40d into valve passageway 104e. Valve opening mechanism 148b comprises pusher 166. When pusher 166 pushes onto opener 114, opener 114 opens valve 40d by body 116 pushing into valve passageway 104e and forming passage through recess 122. Passageway 104e then fluidly connects chamber 135 and cavity 164 to the inside of bottle B. Pump 126b forms a seal with pump guide 78 or pump support 72.

When the desired vacuum is achieved and the pump is withdrawn, indicator 86 when present is in depressed state 96 and vacuum forces exerted on valve 40d push opener 114 up closing passageway 104e.

Vacuum pump 128c (FIG. 15) has a suitable valve opening mechanism which may be a needle or other mechanical element for opening valves 40, 40a, 40b, and 40d. Valve opening mechanism 148c has a wedge 168 having at body 170 and vertically extending recess or internal recess 171. Body 170 of wedge 168 is preferably substantially conical or has a shape matching tapering section 106 except for vertically-extending recess 171. Recess 171 may have a substantially rectangular profile or a curved profile which can be substantially a semi-circle or a semi-oval. Wedge 168 opens valve 40e by body 170 pushing into valve passageway 104e (without retention device 120) and forming a passage through recess 171. Passageway 140 in combination with recess 171 then fluidly connects cavity 135 to the inside of bottle B. Vacuum pump 128c forms a seal with pump guide 78 or pump support 72 of the bottle stopper. When the desired vacuum is achieved and the vacuum pump is withdrawn, indicator 86 is in depressed state 96, indicating a vacuum in the bottle.

Vacuum pump 128 and one or more matching stoppers 30 may be sold as a kit.

Stoppers in accordance with the invention can be formed by any suitable method. Injection molding is one particularly suitable method and permits the various elements of the stopper, including the filter to be integrally formed with the other portions of the stopper, including the cap, attaching strand and valve, except as otherwise indicated. Any suitable material can be used to make a stopper in accordance with the invention. For example, rubber or resins, natural or synthetic, may be used and should be food compatible or food grade. One such resin is Santoprene® resin. Metallic components may be added to the molded stopper for aesthetics or for reinforcement as desired.

Any suitable type of pump can be used to evacuate a stoppered bottle in accordance with the invention. Pumps in accordance with the invention can be made by any suitable method known in the pump art and of any suitable material known in the pump art.

Figure 18:
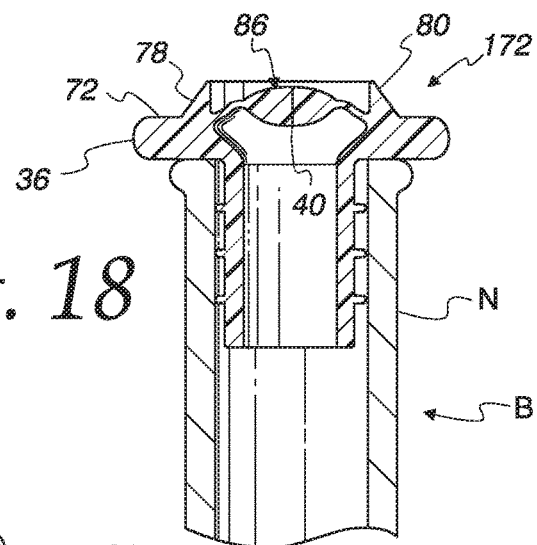
FIG. 18 is a cross-sectional elevation view of another embodiment of the stopper without a removable cap.

FIG. 18 illustrates a vacuum stopper 172. Vacuum stopper 172 lacks a removable cap, filter, and air passageway, but is otherwise the same or similar to vacuum stopper 30. Notably, it has a pump base support 72 comprising a shoulder 36, a pump locating guide 78 comprising raised ridge 80, a vacuum indicator 86, and vacuum valve 40. Stopper 172 can be used to store wine under vacuum. To serve the stored wine, stopper 30 is removed from the bottle. Vacuum stopper 172 has the advantage of being more compact so that it is easier to store a stoppered bottle B in a refrigerator, for example.

FIG. 19 illustrates a vacuum stopper 174. Vacuum stopper 174 uses an o-ring 176 instead of an integral ring 68 to make a seal between removable cap 178 and upper portion 180. Stopper 174 could also have an integral ring 68 for sealing in addition to o-ring 172. Removable cap 178 and upper portion 180 have recesses 182 and 184, respectively, for accepting o-ring 176. Preferably, recess 184 is relatively deeper than recess 182 so that o-ring 176 stays with upper portion 180 when removable cap 178 is removed. O-ring 176 may be located in a floor 186 of upper portion 180. Stopper 174 also has an o-ring 188 located in recess 190 in neck portion 192. O-ring 188 is shown as supplementing integral sealing rings 42 from stopper 30, but may also be used in addition to integral sealing rings 42. O-ring 188 may be located at any suitable location in neck portion 192 including, for example, substantially at the junction of the underside of shoulder portion 36 and neck portion 192. Vacuum stopper 174 has the advantage of having o-rings 176 and 188, which may be replaced if they no longer seal properly.

Figure 20:
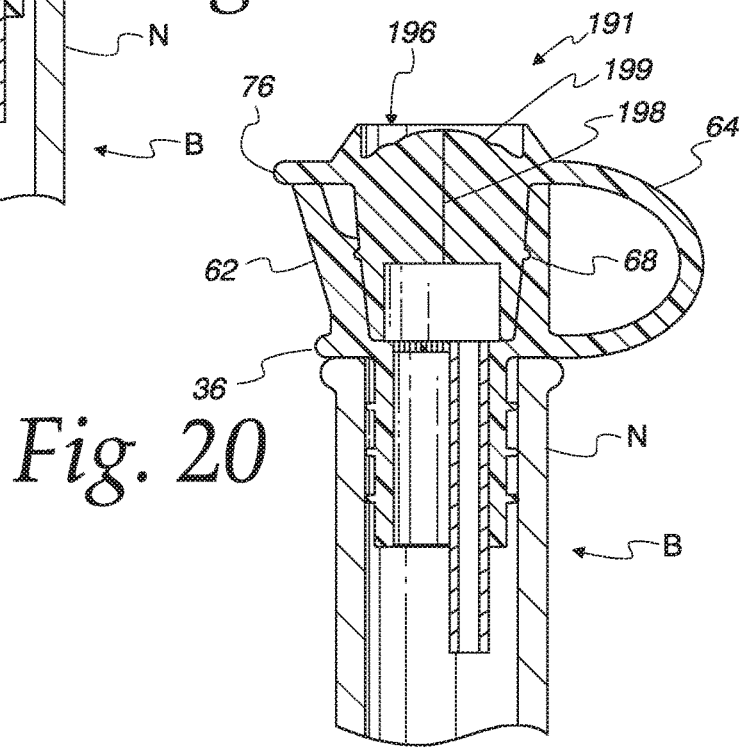
FIG. 20 is a cross-sectional elevation view of another embodiment of a vacuum bottle stopper of the invention.

FIG. 20 illustrates a vacuum stopper 191 which is the same or similar to stopper 30 except that removable cap 196 has a longer valve passageway 198, a much thicker top 199 and no vacuum indicator. The thickness of top 199 is preferably such that top 199 is not hollow at the level of ring 68 providing more compressive force on ring 68 and therefore a better seal. Similarly, thicker top 199 affords a longer passageway 198 with compressive force sealing passageway 198 along its entire length and therefore potentially a better seal.

Figure 21:
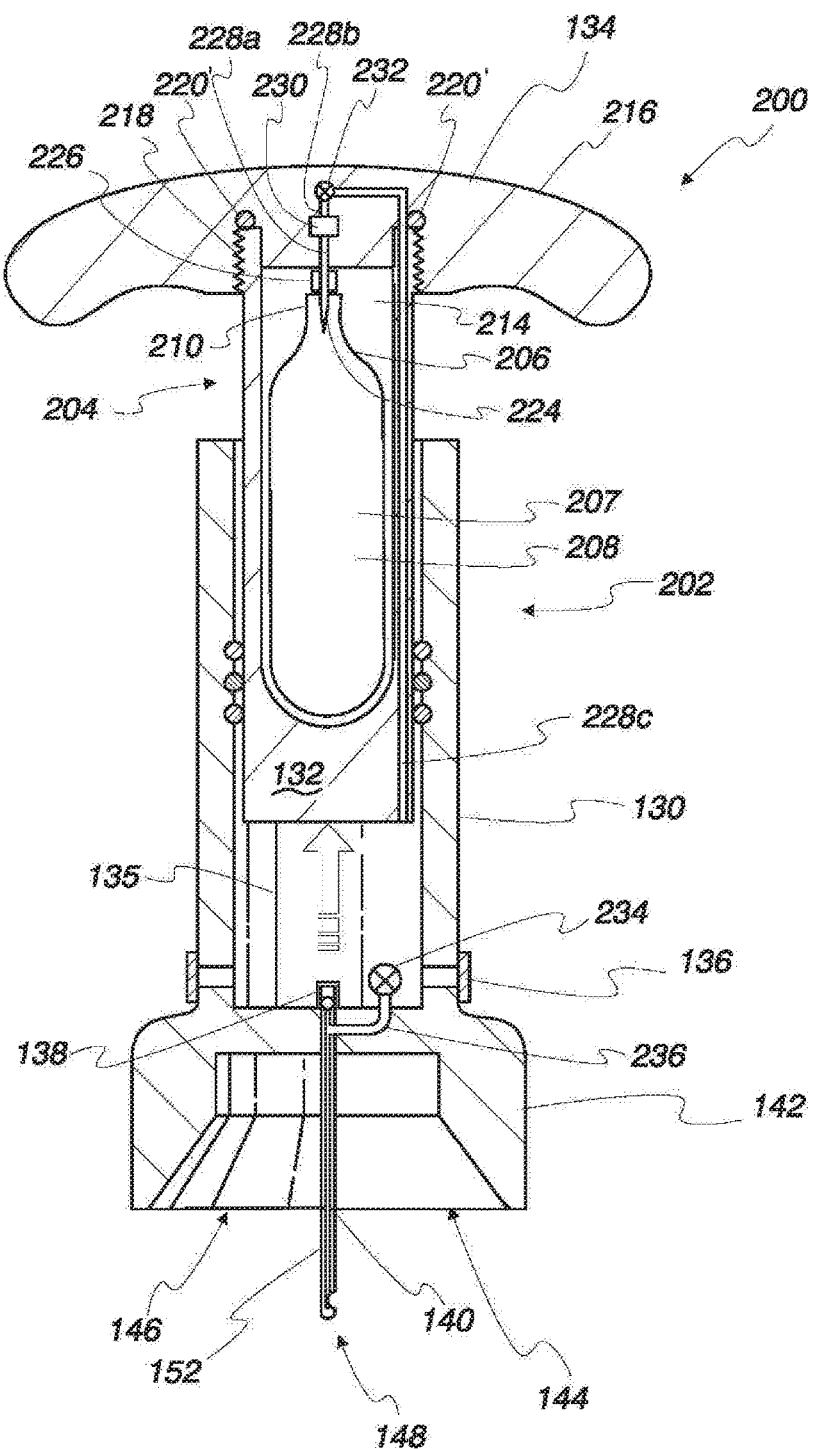
FIG. 21 is a cross-sectional elevation view of an embodiment of a vacuum pump device in accordance with the invention that can both withdraw the gas in a bottle and deliver inert or other desired gas to a wine bottle from an internal supply of that gas with some schematic elements.

In accordance with other aspects of the present invention, the various vacuum bottle stoppers of the invention may be used with a supply of inert or other gas to fill the headspace H or empty portion of a bottle B with inert or other desired gas as shown in FIG. 21-25. In FIG. 21, a system 200 for providing vacuum and an inert or other gas including a vacuum pump 202 having an internal gas supply 204 is illustrated. System 200, as well as the other systems described herein, can be marketed as a kit and can also include, for example, one or more vacuum bottle stoppers in accordance with the invention, with one or more inert gas cartridges, for example, such as described herein. Vacuum pump 202 as illustrated has similarities to vacuum pump 128 especially as to providing a vacuum and connecting to a bottle stopper, but vacuum pump 202 could also be constructed to be similar to pumps 128a-c. Gas supply 204 includes a replaceable, disposable cartridge 206. Cartridge 206 has an internal chamber 207 for holding an inert gas under pressure, body 208 and neck 210. Cartridge 206 holds inert gas under pressure, and could be similar to the well-known $CO_2$ cartridges used for BB guns. As illustrated, cartridge 206 is a non-threaded cartridge having a non-threaded neck 210. An alternative cartridge 212 shown in FIG. 24 could be used instead. Cartridge 206 is located in chamber 214, which can be at least partially contained inside piston 132. Chamber 214 may extend into handle 216. The terms "inert gas" or "other gas" means a gas different from the normal atmospheric mixture of gases. Non-limiting examples of inert or other gas are nitrogen, carbon dioxide, gas compounds that may add flavors, fragrances, preservatives and mixtures thereof to the wine (or to other liquid contents stored in the bottle besides wine, e.g., olive oil as a non-limiting example).

Handle 216 has threads 218 so that handle 216 can be connected and disconnected from piston 132. Internal gas supply 204 also includes a seal 220', a hollow projection 224, a seal 226, a passageway 228, a regulator 230, and a valve 232. Seal 220' effects a gas-tight seal when handle 216 and piston 132 are properly connected. Projection 224 is in fluid communication regulator 230, which is shown as a "black box" in FIG. 21, by segment 228a of passageway 228. Regulator 230 may be any kind of suitable regulator including single-stage and dual-stage types. Regulator 230 is designed to provide inert gas at a sub-(below) atmospheric pressure, at about atmospheric pressure or at a super-(above) atmospheric pressure. Preferably, the pressure is sub-atmospheric, typically 50-400 millibars below atmospheric pressure, mare preferably 100-200 millibars below atmospheric pressure, resulting in an absolute pressure in the wine bottle in the range of from about 0.6 to about 0.95 atmospheres. Regulator 230 is in fluid communication with valve 232, which is shown schematically in FIG. 21. Valve 232 may be any suitable kind of valve, for example, a self-closing poppet valve, a ball valve or a butterfly valve. Valve 232 may be opened by any suitable actuator (not illustrated), for example, a push button or a lever on the side of handle 216. Valve 232 is in fluid communication with pump chamber 135. Passageway 228 connects valve 232 to pump chamber 135 via passageway segment 228c. The order of valve 232 and regulator 230 may be reversed so that valve 232 is upstream of regulator 230.

Unlike pump 128, pump 202 has a valve 234 (shown schematically in FIG. 21) and a passage 236 for supplying inert gas to the bottle from chamber 135. Valve 234 can be any suitable valve such as ball or butterfly valve actuated by an actuator (not shown) on the exterior of pump 202. Valve 234 can be a poppet valve, for example, which is actuated by pushing piston 132 fully down so that it pushes the poppet downwards to open valve 234. Passage 236 connects to passage 140 below one-way valve 138 so that the inert gas can travel from chamber 135 into bottle B.

Gas supply 204 can be activated by placing cartridge 206 neck-last into chamber 214. Chamber 214 is sized to hold cartridge 206 upright and in a generally loose friction fit so that screwing handle 216 to piston 132 causes projection 224 to puncture cartridge 206 and for seal 226 to press against the top of cartridge 206 to form a gas-tight seal. Alternatively, projection 224 can be located at the bottom of chamber 214 and cartridge 206 is inserted neck-first into chamber 214.

Figure 22:
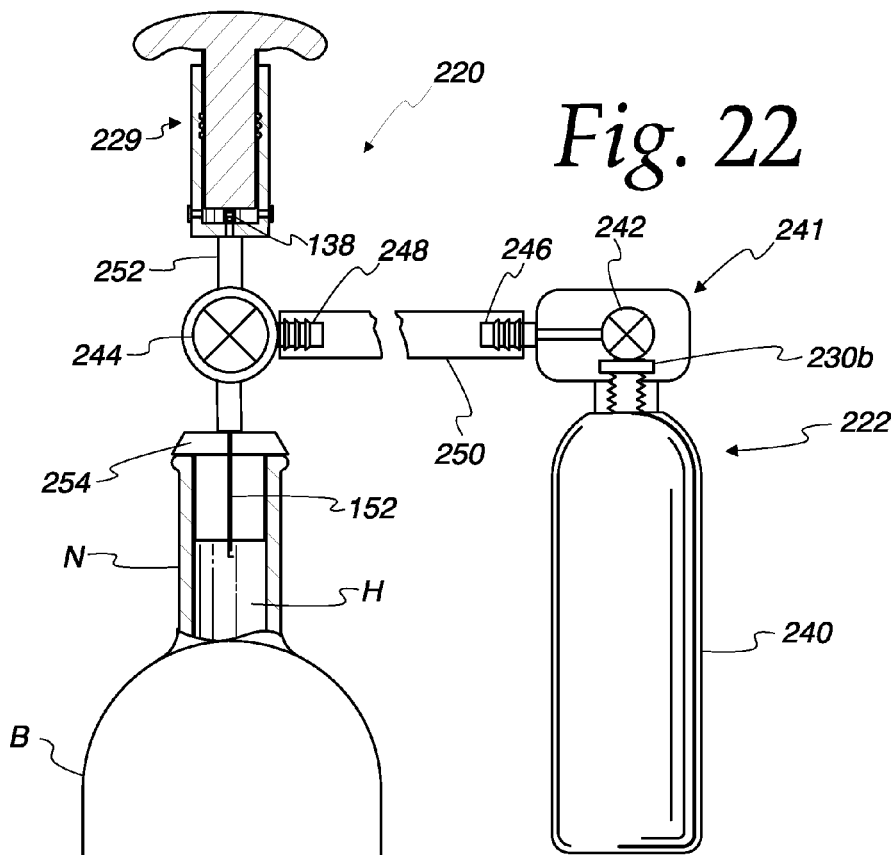
FIG. 22 is a cross-sectional elevation view of another embodiment of a vacuum pump device in accordance with the invention that can both withdraw the gas in a bottle and deliver inert or other desired gas to a wine bottle from an external supply of that gas with some schematic elements.
Figure 23:
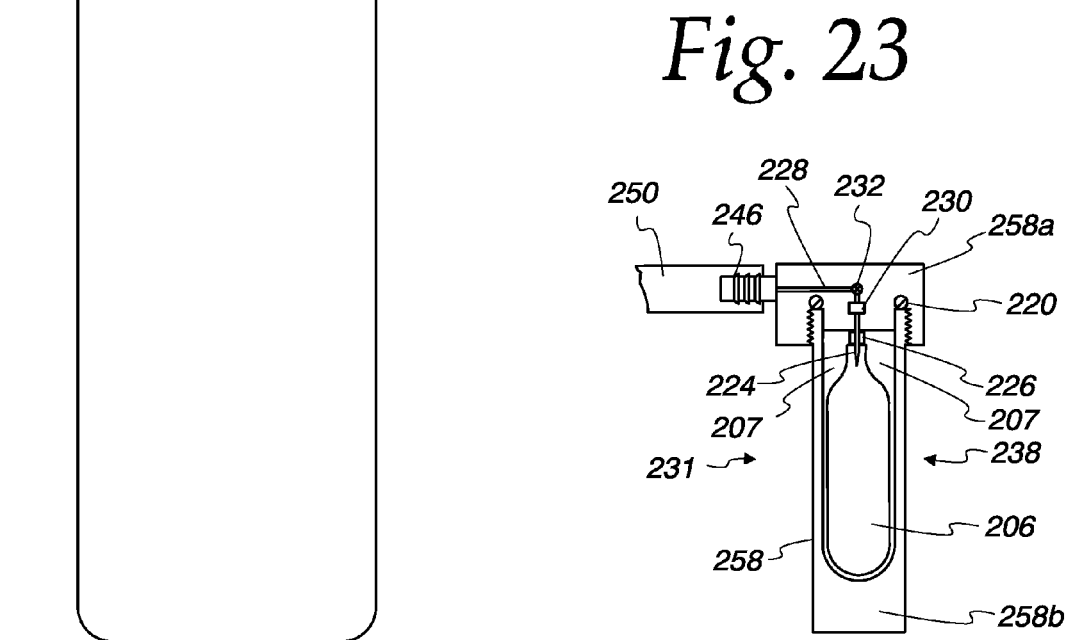
FIG. 23 is a cross-sectional elevation view of another embodiment of an external supply of inert or other gas in accordance with the invention that may be used with the vacuum pump of FIG. 22 with some schematic elements.

In FIG. 22, a system 220 for providing vacuum and then an inert gas to the interior of a bottle B, including a vacuum pump 229 and external inert gas supply 222 is illustrated. Vacuum pump 229 as illustrated may be similar to vacuum pumps 128, 128a-c, as to the details for providing a vacuum. External gas supply 222 includes a canister or cylinder 240 and a regulator device 241 having a regulator 230b and an on-off valve 242 (both shown schematically) operated by an actuator (not shown) on the outside of regulator device 241. Regulator device 241 is installed in the neck of cylinder 240. Regulator 230b supplies inert gas at the same pressures as regulator 230 as shown in FIG. 23. System 220 includes a three-way valve 244, hose barbs 246 and 248, and flexible hose 250 for fluidly connecting regulator 230b to valve 244. Valve 244 is connected to vacuum pump 229 by a short length of hose or pipe 252 and to a hollow needle 152. Valve 244 and needle 152 may be considered to be part of pump 229. System 220 connects by needle 152 to headspace H of bottle B through a stopper 254 installed in neck N of bottle B. Stopper 254 may be stopper 30, 172, or 174.

In FIG. 23, an external inert gas supply 238 for use with pump 229 to form a system 231 is illustrated. Gas supply 238 has a housing 258 having a chamber 207 for cartridge 206. Housing 258 has two portions 258a and 258b that screw together. Portion 258a has projection 224, seal 226, regulator 230, valve 232 and passageway 228 therebetween. Portion 258a has a connector such as hose barb 246 for connecting to hose 250.

In FIG. 24, an external inert gas supply 239 connected to stopper 30 in neck N is illustrated. Gas supply 239 includes a threaded cartridge 212 having a threaded neck 212' and a device 264 for supplying gas from cartridge 212 as illustrated although non-threaded cartridge, such as Cartridge 206 could be used in conjunction with a housing. Device 264 has projection 224, seal 226, regulator 230, valve 232 and passageway 228 therebetween. Device 264 has a threaded coupler 266 for threadingly coupling with neck 212' and puncturing cartridge 212 with projection 224. Alternatively, threaded coupler 266 may threadingly couple with cylinder 240. Device 264 also has a discharge portion 268. Discharge portion 268 has a valve opening mechanism 148 having needle 152 as illustrated or valve opening mechanism 148b or 148c, and optionally a shroud or stopper mating portion 270 having a shape 272 matching the shape of guide 78. Guide 78 and stopper-mating portion 270 may cooperate to guide the positioning of device 264 as it is placed onto stopper 30 (or 172, or 174) so that valve-opening mechanism 148 (or 148b or 148c) opens valve passageway 104a (or 104b, 104c or 104d). Portion 270 may form a gas-tight seal with stopper 30 in the same way pump 128b does. Needle 152 may be partially or completely recessed within portion 270. Supply 239 may be used with a pump 128, 128a, 128b or 128c as suitable as part of a system.

FIG. 25 illustrates a coupler 276 connected to stopper 30 installed in neck N. Coupler 276 is part of a system 245 for providing a vacuum and an inert gas. Coupler 276 can connect to external gas supply 222 or 238 and to vacuum pump 229 having a suitable connector such as a hose barb. Coupler 276 can have a stopper-facing shape 278 matching the shape of guide 78 for the same purposes that discharge portion 268 has shape 272. Coupler 276 can have a valve opening mechanism 148 having needle 152 as illustrated or valve opening mechanism 148b or 148c. Coupler 276 may form a gas-tight seal with stopper 30 in the same way pump 128b does. Coupler 276 has a valve 280 shown schematically and a suitable connector such as hose barb 248 for connecting to hose 250. Valve 280 may be any suitable 2-way valve including a self-closing poppet valve, a butterfly valve or a ball valve.

Operation of Stopper, Pump and Methods of Use

Various methods of the invention are described herein. One method of using stopper 30 is to serve wine from a recently opened bottle B through stopper 30. This method includes installing stopper 30 in an open bottle B of wine. Wine is then poured out of bottle B through stopper 30 through wine passageway 46. As wine passes wine passageway 46, filter 50 advantageously filters and aerates wine. Simultaneously and advantageously, air is drawn through air passageway 48 providing a smooth pour. Removable and resealable cap 38 can be inserted into stopper 30 closing wine passageway 46 to reduce aeration of the remaining wine to otherwise protect the wine from flying insects, for example, and to prevent accidental spillage of wine. Cap 38 can be removed later so that additional wine can be poured from the bottle.

Another method of using a stopper of the invention, such as stopper 30, is to use the stopper for evacuating and storing bottled wine. As used herein, "vacuum" means a partial vacuum, not a complete or perfect vacuum. Similarly, evacuating does not require the entire gaseous contents of a bottle to be removed, which in any event is not possible. Typically, this method is used on bottled wine that has been opened and partially consumed with the wine that has been consumed being replaced by air. To reduce or prevent deleterious oxidation during storage, stopper 30 is installed in open bottle B and removable cap 38 is inserted into upper portion 54. Valve 40 is opened tip 154 of hollow needle 152 through valve passageway 104e establishing fluid communication between the interior of bottle B and chamber 135 of pump 128 through passageway 140 or through flexible tubing, for example. In some embodiments, opening valve 40 further comprises inserting valve opener 114 through valve opening 102 into valve passageway 104 guided by tapering section 106. Alternatively, valve 40 is opened as follows pump guide 78 guides the pump, preferably onto pump support 72, which supports the pump during pumping. Preferably valve passageway 104 forms a seal around valve opener 114 comprising hollow needle 152 obviating the need to form a seal elsewhere between stopper 30 and pump 128. The seal around needle 152 is formed due to the expansion of valve passageway 104 by needle 152. Before vacuum is drawn, vacuum indicator 86 is in normal state 94 and vacuum indicator 86 covers marking 160 on opener 114. Once fluid communication is established by valve opener 114, the wine bottle is evacuated by drawing air from bottle B through opener passageway 122 and valve passageway 140 into chamber 135 of pump 128 as piston 132 and piston handle 134 move up. Continued pumping increases the vacuum in bottle B eventually causing indicator 86 to move into vacuum-indicating state 96 revealing marking 160, which signals to the user that sufficient vacuum had been achieved in bottle B for longer-term storage. Indicator 86 may tend to move downwardly incrementally towards vacuum indicator 96 as the vacuum increases or it may tend to stay in state 94 until a desired storage vacuum is achieved and then move abruptly to state 96, depending on the particular design and materials of construction; for example. Marking 160 may be visible to the user because the pump base 142 is clear or because pump base 142 has a window (not shown).

In one embodiment, once sufficient vacuum is achieved, which is preferably indicated by indicator 86 of stopper 30 or indicator 160 in FIG. 17, pump 128 is disengaged by a user thereby withdrawing the body of valve opener 114 from valve 40 or withdrawing needle 152 from valve 40. Valve passageway 104 closes itself due to compressive forces in the elastomeric material through which valve passageway 104 traverses, to provide a vacuum seal.

In an alternative embodiment, once sufficient vacuum is achieved, an inert gas supply, for example, such as any of inert gas supplies 204, 222, 238 or 239, is coupled to the stopper. The vacuum pump may or may not be decoupled from the stopper before coupling the inert gas supply by withdrawing the pump from the stopper. If the pump remains connected, a valve may be opened to the inert gas supply and a valve closed to the vacuum or a single valve may be actuated to achieve both. Inert gas, preferably at a subatmospheric pressure, is introduced into the wine bottle, preferably through the same passageway used earlier to evacuate oxygen from the wine bottle. A valve connected to a regulator may be opened to introduce the inert gas. The evacuation of oxygen followed by the introduction of inert gas preserves the wine for later consumption by reducing oxygen while preserving aromas in wine, particularly if the inert gas contains some carbon dioxide. Carbon dioxide in the inert gas reduces the transfer of carbon dioxide from the wine into the headspace, which transfer can strip aromas from the wine. If the partial pressure of carbon dioxide in the headspace matches that of the carbon dioxide dissolved in the wine, then there is no net transfer of carbon dioxide from the wine to headspace H. If the partial pressure of carbon dioxide in the headspace exceeds that of the carbon dioxide dissolved in the wine, then there is a net transfer of carbon dioxide from the headspace H to the wine but there is no stripping of aromas.

The evacuation of oxygen and introduction of inert gas can be repeated to further decrease the amount of oxygen remaining in headspace H.

Another method of the invention is a method of preserving wine in an opened container of wine. The method includes installing a stopper having a valve into an opening of the wine container. The stopper may be stopper 30, 172, or 174, or another suitable stopper. Next air or oxygen is withdrawn from the interior of the bottle through the valve of the installed stopper to form a vacuum in the bottle. An inert gas, typically comprising carbon dioxide, is introduced into the bottle having the vacuum through the valve of the stopper. The valve is closed to retain the inert gas in the Wine container. The wine in the stoppered bottle containing the introduced inert gas can then be stored for four or more hours or for 12 or more hours, or for 1, 2, 3, 4 or more days, for example, before being served and consumed. Depending on the stopper, the stopper may have to be removed to serve the wine or a cap, which is part of the stopper, is removed and the wine poured through the stopper.

The invention has several aspects as to how the air/oxygen is withdrawn and the inert gas is introduced. In one aspect, a single device does both. In particular, for example, pump 202 is placed on top of stopper 30 such that a valve opener is mechanically inserted into a valve passageway of the valve. Next gas in the headspace, which contains oxygen, is evacuated by pump 202 by moving piston 132 in a reciprocating fashion, e.g., up and down or in and out of chamber 135. Once sufficient gas is evacuated, which may be indicated by a vacuum indicator such as vacuum indicator 86, piston 132 is pushed back into chamber 135 if not already pushed back. Assuming a cartridge containing the inert gas is already loaded into chamber 214, a valve is opened to release the inert gas from the cartridge through passageway 228 chamber 135, and the valve passageway (in some cases through needle 152). Generally, the inert gas passes through a regulator 230 to reduce the pressure of the gas. If pump 202 does not contain a regulator, excess pressure will exhaust through exhaust valve 136.

In general, a cartridge can be loaded in two ways depending upon the specific configuration of the device into which the cartridge is loaded. In one way, a suitable cartridge (threaded (212) or non-threaded (206)) can be loaded into a chamber; the chamber is closed by screwing two portions of the chamber together so that a projection 224 punctures the cartridge and the cartridge pushes against seal 226 to form a gas-tight seal around or about the puncture. In the other way, a threaded cartridge 212 is screwed into a threaded coupler, such as coupler 266, together so that a projection 224 punctures the cartridge and the cartridge pushes against seal 226 to form a gas-tight seal around or about the puncture.

In other aspects, separate devices, e.g., systems 220, 231, 243 or 245, are used to withdraw oxygen and introduce the inert gas. A needle or a valve opening device is inserted into a valve passageway. Oxygen is withdrawn from the bottle by a vacuum source such as a vacuum pump 229. If necessary a valve, such as valve 244 or valve 280, is opened to permit fluid communication between headspace H and the vacuum source. After withdrawing oxygen, i.e., some of the oxygen in headspace H, the valve is closed to the vacuum source and opened to an inert gas supply, e.g., supplies 222 or 238.

Between the closing and opening, the vacuum source may be disconnected and the inert gas supply connected to the valve. To introduce the inert gas, a regulator valve, such as valve 242 or 280, is opened.

In another aspect, a vacuum source, such as pump 128 (FIG. 4) is used to withdraw oxygen and then is disconnected from bottle B and the stopper. A device for supplying the inert gas, such as device 264, which may obtain the inert gas from, for example, a cartridge 206 or 212, or canister 240, is used to supply the inert gas. A valve opener of the device is then inserted into the valve passageway to open the stopper valve. Preferably, a discharge portion of the device and a guide on the stopper cooperate to guide the mating of the discharge portion to the stopper and the insertion of the valve opener. A regulator valve is actuated to supply the inert gas into the headspace. Next the device is decoupled from the stopper.

Another method of using a stopper in accordance with the invention, such as stopper 30, is to serve wine from a bottle that has been stored under a vacuum within bottle B with stopper 30 in neck N of bottle B. The headspace H may also be enriched in carbon dioxide by the introduction of carbon dioxide from outside the bottle from an inert gas supply containing carbon dioxide. Vacuum in the bottle is released by pushing tab 76 up away from bottle B causing air to enter past spout 62, cap sealing ring 68 and into bottle B. Cap 38 is removed by pushing tab 76 further up and away from bottle B. Wine is then poured out of bottle B through stopper 30 through wine passageway 46. As the wine passes wine passageway 46, filter 50, if present, advantageously filters and aerates the wine. Simultaneously and advantageously, air is drawn through air passageway 48 providing a smooth pour. Removable cap 38 can be inserted into stopper 30 closing wine passageway 46 to reduce aeration of the remaining wine and to prevent accidental spillage of the wine.

The invention has been described with respect to wine bottles and wine, but it is to be understood that the invention can be used on other bottles and for liquids other than wine. Furthermore, while the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A system for introducing inert gas into a wine bottle for preserving wine in the bottle, the system comprising:
   a bottle stopper having a body composed of a neck portion for insertion into the neck of the wine bottle, the neck portion configured for liquid sealing the neck of the wine bottle and for maintaining a vacuum inside the bottle, an upper portion extending above the neck portion, and a fluid passageway for pouring wine from the bottle through the neck portion and the upper portion, a removable cap comprising a vacuum valve having a self-closing valve passageway that extends to the fluid passageway, the self-closing valve passageway adapted to be opened by mechanical insertion of a valve opener into the self-closing valve passageway and the removable cap adapted to be inserted into the upper portion of the body of the bottle stopper to form a closed position, to form a vacuum-maintaining seal and to close the bottle stopper;
   the valve opener for opening the vacuum valve of the bottle stopper;
   a first fitting for mating with a top of the bottle stopper when the bottle stopper is installed in the wine bottle and aligning the valve opener with the self-closing valve passageway of the bottle stopper for opening the vacuum valve;
   a pressurized source of inert gas; and
   a regulator for regulating a pressure of the pressurized source of inert gas to a sub-atmospheric pressure and a passageway for introducing a sub-atmospheric pressure gas to the wine bottle through the self-closing valve passageway.

2. The system of claim 1 further comprising a second fitting for mating with the top of the bottle stopper when the bottle stopper is installed in the wine bottle and aligning the valve opener with the self-closing valve passageway of the bottle stopper for opening the vacuum valve.

3. The system of claim 1 further comprising a source of vacuum for withdrawing oxygen from the Wine bottle through the self-closing valve passageway.

4. The system of claim 3 wherein the source of vacuum comprises a vacuum pump.

5. The system of claim 4 wherein the vacuum pump further comprises the pressurized source of inert gas contained within a housing of the vacuum pump that permits an introduction of the inert gas into the wine bottle that has been evacuated by the vacuum pump while the vacuum pump is in communication with an interior of the wine bottle.

6. The system of claim 4 wherein the source of pressurized inert gas is a cartridge containing a pressurized inert gas.

7. The system of claim 6 wherein the cartridge is a replaceable cartridge.

\* \* \* \* \*

UNITED STATES PATENT AND TRADEMARK OFFICE
CERTIFICATE OF CORRECTION

PATENT NO.         : 9,656,847 B2
APPLICATION NO.    : 14/214038
DATED              : May 23, 2017
INVENTOR(S)        : Jean E. Haley, James D. Ryndak and Roger M. Masson It is certified that error appears in the above-identified patent and that said Letters Patent is hereby corrected as shown below:

On the Title Page

In the Abstract, Line 5, delete "the" (first occurrence) and insert therefor --then--.

In the Specification

Column 10, Line 65, delete "large" and insert therefor --larger--.
Column 13, Line 4, delete "126b" and insert therefor --128b--.
Column 13, Line 11, delete "126b" and insert therefor --128b--.
Column 13, Line 20, delete "at" and insert therefor --a--.
Column 14, Line 33, delete "FIG." and insert therefor --FIGS.--.
Column 14, Line 55, delete "means" and insert therefor --mean--.
Column 15, Line 1, after "communication" insert --with--.
Column 15, Line 9, delete "mare" and insert therefor --more--.
Column 15, Line 10, after "pressure," insert --thus--.
Column 15, Line 27, after "as" insert --a--.
Column 16, Line 8, after "although" insert --a--.
Column 17, Line 5, after "opened" insert --by inserting--.
Column 17, Line 29, delete "had" and insert therefor --has--.
Column 17, Line 32, before "96" insert --state--.
Column 18, Line 43, before "gas" insert --inert--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*